US012068966B2

(12) United States Patent
Mishra et al.

(10) Patent No.: US 12,068,966 B2
(45) Date of Patent: Aug. 20, 2024

(54) SYSTEM AND METHOD FOR AUTONOMOUS DATA AND SIGNALLING TRAFFIC MANAGEMENT IN A DISTRIBUTED INFRASTRUCTURE

(71) Applicant: A5G Networks, Inc., Westford, MA (US)

(72) Inventors: Rajesh Kumar Mishra, Westford, MA (US); Kaitki Agarwal, Westford, MA (US)

(73) Assignee: A5G Networks, Inc., Nashua, NH (US)

( * ) Notice: Subject to any disclaimer, the term of this patent is extended or adjusted under 35 U.S.C. 154(b) by 220 days.

(21) Appl. No.: 17/676,415

(22) Filed: Feb. 21, 2022

(65) Prior Publication Data

US 2022/0272043 A1 Aug. 25, 2022

Related U.S. Application Data

(60) Provisional application No. 63/151,768, filed on Feb. 21, 2021, provisional application No. 63/151,769, filed on Feb. 21, 2021.

(51) Int. Cl.
*H04L 47/2416* (2022.01)
*G06F 18/214* (2023.01)
(Continued)

(52) U.S. Cl.
CPC ........ *H04L 47/2416* (2013.01); *G06F 18/214* (2023.01); *G06N 20/00* (2019.01);
(Continued)

(58) Field of Classification Search
CPC .. H04L 63/0435; H04L 47/2416; G06N 20/00
See application file for complete search history.

(56) References Cited

U.S. PATENT DOCUMENTS 10,530,858 B1 * 1/2020 Parulkar ............... G06F 16/178
2015/0207846 A1 * 7/2015 Famaey ................ H04L 67/563
709/219
(Continued)

FOREIGN PATENT DOCUMENTS

| CN | 111984364 A | 11/2020 |
|---|---|---|
| EP | 3871443 A1 | 9/2021 |
| WO | 2020176535 A1 | 9/2020 |

*Primary Examiner* — Nicholas P Celani
(74) *Attorney, Agent, or Firm* — Schwegman Lundberg & Woessner, P.A.

(57) ABSTRACT

A system and method for autonomous data and signalling traffic management in a distributed infrastructure is disclosed. The method includes a distributed multi-cloud computing system with machine learning based intelligence across heterogenous computing platforms hosting mobile network functions, capable of leveraging AI based distribution across all the resources to creates autonomous network operations and intelligently work around any impairments. The method includes determining one or more service nodes by using a trained traffic management based ML model and establishing one or more cloud mesh links between the one or more service nodes at multiple levels of hierarchy based on the system, environment and network parameters and the current network demand. Further, the method includes processing the request by providing access of the one or more services hosted on the one or more external devices to the one or more electronic devices via the one or more cloud mesh links.

20 Claims, 10 Drawing Sheets

(51) Int. Cl.
   *G06N 20/00*     (2019.01)
   *H04L 9/40*      (2022.01)
   *H04L 47/2483*   (2022.01)
   *H04L 47/60*     (2022.01)

(52) U.S. Cl.
   CPC .......... *H04L 47/2483* (2013.01); *H04L 47/60* (2013.01); *H04L 63/0435* (2013.01)

(56) References Cited

U.S. PATENT DOCUMENTS

| | | |
|---|---|---|
| 2017/0332420 A1* | 11/2017 | Cui .................... H04L 61/5014 |
| 2019/0220703 A1 | 7/2019 | Prakash et al. |
| 2020/0050951 A1 | 2/2020 | Wang et al. |
| 2020/0403935 A1 | 12/2020 | Yerli |
| 2021/0019194 A1 | 1/2021 | Bahl et al. |
| 2021/0144517 A1* | 5/2021 | Guim Bernat .......... H04L 67/10 |
| 2021/0243247 A1 | 8/2021 | He et al. |
| 2021/0258217 A1 | 8/2021 | Chen et al. |
| 2021/0263667 A1 | 8/2021 | Whitlock et al. |

* cited by examiner

SYSTEM AND METHOD FOR AUTONOMOUS DATA AND SIGNALLING TRAFFIC MANAGEMENT IN A DISTRIBUTED INFRASTRUCTURE

CROSS-REFERENCE TO RELATED APPLICATION

This application claims the benefit of Provisional applications filed in the USA bearing application No. 63/151,769 titled "Seamless Private Networks with Operator interconnection Core" filed on Feb. 21, 2021 and application No. 63/151,768 titled "Autonomous, Distributed, Local and Multi Cloud Core by using Cloud Mesh Links" filed on Feb. 21, 2021.

FIELD OF INVENTION

Embodiments of the present disclosure relate to heterogenous and distributed cloud infrastructure and more particularly relates to a system and a method for autonomous data and signalling traffic management in a distributed infrastructure.

BACKGROUND

With the advancements in technology, such as 5G technology, data and control traffic flow in the network has drastically increased. This increased traffic will put significant demand on transport and other aspects of the network. Some of new drivers for this increased traffic are smart cities, industrial automation, digitalization, and connected cars and the likes. Further, other drivers for this traffic increase are increased video streaming, new services and applications such as Augmented Reality (AR) or Virtual Reality (VR), cloud gaming and the like. This includes both north-south traffic as well as East-West traffic. Generally, mobile operators use centralized data-center to manage and terminate flow of the data and control traffic. In some recent deployments, mobile operators have been moving data traffic management to regional or edge data centers but control traffic is still centralized. These data centers run cloud-based software and applications. Furthermore, enterprises and Communications Service Providers (CSPs) are trying to handle this increased data traffic by bringing data closer to the data consumption point. This movement will significantly increase the number of data centers. Further, these smaller data centers don't have the same resiliency, backup, and compute as centralized data centers. Currently, 4G, 5G or Wi-Fi networking software is not designed to handle the distributed traffic in a less resilient, compute-constrained environment. This will result in additional Capital Expenditures (CAPEX) and Operating Expenses (OPEX). FIG. 1 is a schematic representation of multiple edge or far edge data centers 102 hosting various network functions and services for serving multiple users, in accordance with a prior-art. FIG. 1 depicts a central core data-center cloud 104, regional data-center clouds 106 and multiple data center cloud connected with the regional data-center clouds 106 or the central core data-center cloud 104. These data centers may run cloud platform and infrastructure software from a variety of vendors, such as AWS, Google, Vmware, Redhat, IBM, Oracle, Azure and the like. The one or more users may connect to fiber, Low Power Wide Area (LPWA), 5G radio network, 4G radio network, Wi-Fi AP and the like to connect to the mobile packet and voice core network functions and services running on the multiple edge data centers 102 or regional data-center clouds 106 or central core data-center cloud 104 via one or more electronic devices 108. These mobile packet and voice core network functions running on the multiple edge data centers 102, the central core data-center cloud 104, and the regional data-center clouds 106 may use the underlying cloud platform and infrastructure software from different vendors. This cloud platform and infrastructure software may include cloud configuration, networking, security and container and Virtual Machine (VM) orchestration and the like. The multiple edge data center 102, the central core data-center cloud 104 and the regional data-center clouds 106 may also have different characteristics, configuration, energy consumption and resiliency strategy for compute. Since the multiple edge data centers 102 are connected to the regional data-center clouds 106 or the central core data-center cloud 104, the overall network architecture becomes very complex for serving 4G, 5G, 6G and WiFi control and data traffic and the like. Further, it is also very difficult to maintain and observe the network functions running in multiple edge data centers 102. Further the distribution of data center resources is static for 4G, 5G, 6G and WiFi core network functions, that leads to inefficient use of datacenter resources and increases overall cost. Further the allocation of the best Content Delivery Network (CDN) is done based on static policies, that leads to degraded service experience. Furthermore, due to the large number of distribution locations, security has become a concern and overall attack surface is increased. Since the control is still centralized, it is prone to large network outages if the central sites go down. Also, the traditional mechanism of using the multiple edge data centers 102 increase overall cost of the network architecture including capital expenditure and operating expenses. The traditional mechanism fails to provide seamless service experience between the multiple edge data centers 102. Furthermore, the traditional mechanism also fails to provide desired return on revenue and monetization of new services. Further, as multiple enterprises may be connecting with multiple operator networks they may need a neutral service and communication infrastructure for data and control traffic.

Further, as cloud-based services and user consumption of data grows, the operators desire to save cost and provide scalable solutions to serve enterprises. Generally, operators host their networking software either locally or on a single cloud provider, but it is changing to involve multiple cloud providers or use hybrid cloud. However, the conventional systems do not allow seamless integration of 4G, 5G, 6G, WiFi functions running on different clusters of cloud and applications hosted on different cloud instances. The conventional systems also fail to consider all resources, such as local servers and the cloud server, across different providers while accessing one or more services and are constrained by limits of a single resource leading to increase in latency and decrease in throughput. The conventional systems fail to allow seamless enterprise integration with operator networks including roaming. The conventional system doesn't have a system to manage traffic between different locations of the same enterprise, such as Bavarian Motor Works (BMW) has multiple manufacturing facilities and each location may have an on premises 5G network that needs to communicate to other locations. BMW may use different cloud providers for different locations for cost and resiliency reasons. While this architecture may be implemented using conventional system, it may have unmanaged and unoptimized control and data traffic, leading to increased OPEX and CAPEX. It will also have different service experience across heterogenous and hybrid data center infrastructure.

Thus, the conventional systems are costly, unscalable, slow and experience throughput and resilience challenges.

The total addressable market for 4G, 5G private networks (enterprise network) is forecast to increase from $3.7 billion in 2021 to more than $109.4 billion in 2030, according to a report by ABI Research. Private networks are a key enabler of industry automation and digitalization. In the current networks, communication network infrastructure is owned by individual operators. They manage and maintain the entire infrastructure and enable roaming agreements in the network for allowing mobile broadband users to get service across different operators. Many private networks are owned and operated by enterprises, not necessarily by the mobile operator. But these private networks still need seamless interconnect with the mobile operator networks such as ATT, Verizon and T-Mobile. In the case of communication infrastructure that is completely owned by mobile operator they work out a roaming agreement with other mobile operators. In the case of private networks, it is becoming more democratized, and the ownership is fragmented. Hence the communication infrastructure for providing seamless interconnect across multitude of private networks and public networks owned and operated by mobile operators shall be defined in such a way to provide more neutral treatment for public, private network roaming In one scenario different enterprises may have some SLA or roaming agreement to allow users from the other enterprises to get connectivity in their networks. Another aspect of private to public interconnect is security across all the communication links. With fragmented ownership it is difficult to provide a robust and uniform security for communication and data storage. Existing private network systems are primarily hosted locally or on a single cloud provider (private cloud or public cloud). Existing systems do not allow seamless enterprise integration with plurality of operator networks across different platforms and cloud providers.

There is no system that is capable of leveraging AI based distribution across ALL the resources, including but not limited to local or various cloud providers. Further there is no system that is capable of resolving the constraints of a given resource, and detecting the resource change need and leveraging the existing resources or dynamically find the resource in the network to provide seamless interconnect. Further there is a need to provide security for private networks data and keep it contained within the network and perform all the operations locally without sharing the data across locations. There is also a need for Seamless integration with the existing mobile operator that allows enterprise devices to work outside the enterprises as well.

Hence, there is a need for an improved system and method for autonomous data and signalling traffic management in a distributed infrastructure in order to address the aforementioned issues.

SUMMARY

This summary is provided to introduce a selection of concepts, in a simple manner, which is further described in the detailed description of the disclosure. This summary is neither intended to identify key or essential inventive concepts of the subject matter nor to determine the scope of the disclosure.

In accordance with an embodiment of the present disclosure, a computing system for autonomous data and signalling traffic management in a distributed infrastructure is disclosed. The computing system includes one or more networking units, one or more high performance processors and a memory coupled to the one or more networking units and the one or more high performance processors. The memory includes the plurality of modules in the form of programmable instructions executable by the one or more networking units and the one or more high performance processors. The plurality of modules include a data and control receiver module configured to receive a request from one or more electronic devices within a communication network to access one of: one or more services hosted on one or more external devices and a set of services hosted on internet. The request include: address of the one or more external devices. The one or more external devices include: one or more local servers, one or more cloud servers, one or more proxy servers, compute nodes, content data network, internet and a set of network functions. The plurality of modules also include a computing system parameter determination module configured to determine one or more network parameters based on the received request, one or more device parameters and one or more computing system parameters by using a trained traffic management based Machine Learning (ML) model. The plurality of modules also include a network demand determination module configured to determine current network demand within a cloud infrastructure based on the received request by using the trained traffic management based ML model. The plurality of modules include a node determination module configured to determine one or more service nodes at multiple levels of hierarchy within the cloud infrastructure from a plurality of service nodes based on the determined one or more network parameters and the determined current network demand by using the trained traffic management based ML model. The multiple levels of hierarchy comprise: a first level of hierarchy, a second level of hierarchy and a third level of hierarchy. The first level of hierarchy corresponds to a first proximal distance from the one or more electronic devices. Further, the plurality of modules include a link establishing module configured to dynamically establish one or more cloud mesh links between the determined one or more service nodes at the multiple levels level of hierarchy and the one or more external devices based on the determined one or more network parameters and the determined current network demand by using the trained traffic management based ML model. The plurality of modules also include a request processing module configured to process the received request by providing access of the one or more services hosted on the one or more external devices to the one or more electronic devices via the established one or more cloud mesh links.

In accordance with another embodiment of the present disclosure, a method for autonomous data and signalling traffic management in a distributed infrastructure is disclosed. The method includes receiving a request from one or more electronic devices within a communication network to access one of: one or more services hosted on one or more external devices and a set of services hosted on internet. The request include: address of the one or more external devices. The one or more external devices include: one or more local servers, one or more cloud servers, one or more proxy servers, compute nodes, content data network, internet and a set of network functions. The method further include determining one or more network parameters based on the received request, one or more device parameters and one or more computing system parameters by using a trained traffic management based Machine Learning (ML) model. The method also includes determining current network demand within a cloud infrastructure based on the received request by using the trained traffic management based ML model.

Further, the method includes determining one or more service nodes at multiple levels of hierarchy within the cloud infrastructure from a plurality of service nodes based on the determined one or more network parameters and the determined current network demand by using the trained traffic management based ML model. The multiple levels of hierarchy comprise: a first level of hierarchy, a second level of hierarchy and a third level of hierarchy. The first level of hierarchy corresponds to a first proximal distance from the one or more electronic devices. Also, the method includes dynamically establishing one or more cloud mesh links between the determined one or more service nodes at the multiple levels of hierarchy and the one or more external devices based on the determined one or more network parameters and the determined current network demand by using the trained traffic management based ML model. The method includes processing the received request by providing access of the one or more services hosted on the one or more external devices to the one or more user devices via the established one or more cloud mesh links.

To further clarify the advantages and features of the present disclosure, a more particular description of the disclosure will follow by reference to specific embodiments thereof, which are illustrated in the appended figures. It is to be appreciated that these figures depict only typical embodiments of the disclosure and are therefore not to be considered limiting in scope. The disclosure will be described and explained with additional specificity and detail with the appended figures.

BRIEF DESCRIPTION OF DRAWINGS

The disclosure will be described and explained with additional specificity and detail with the accompanying figures in which.

Figure 1:
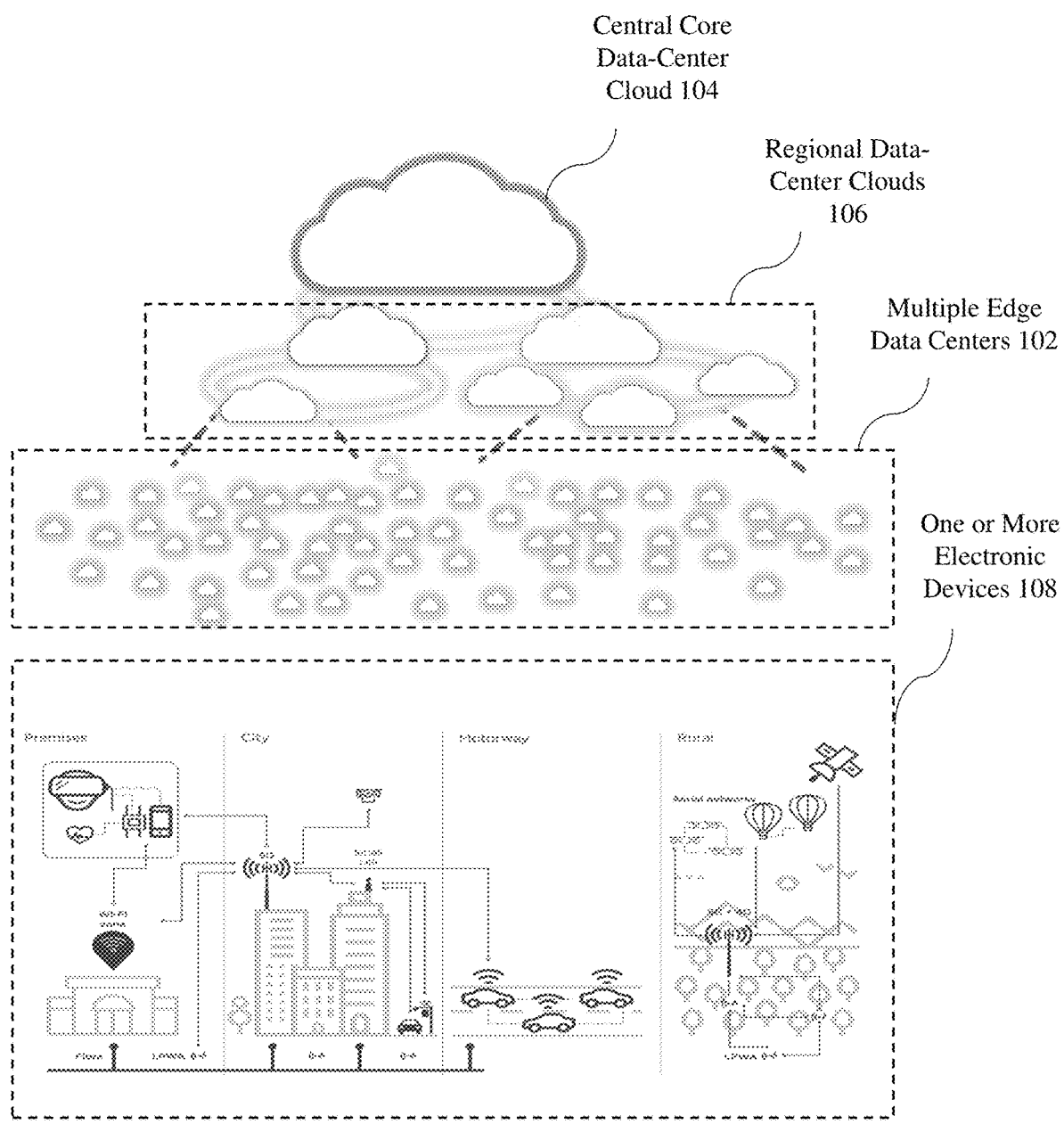
FIG. 1 is a schematic representation of multiple data centers serving multiple users, in accordance with a prior-art.

Further, those skilled in the art will appreciate that elements in the figures are illustrated for simplicity and may not have necessarily been drawn to scale. Furthermore, in terms of the construction of the network, one or more functions of the network may have been represented in the figures by conventional symbols, and the figures may show only those specific details that are pertinent to understanding the embodiments of the present disclosure so as not to obscure the figures with details that will be readily apparent to those skilled in the art having the benefit of the description herein.

DETAILED DESCRIPTION OF THE DISCLOSURE

For the purpose of promoting an understanding of the principles of the disclosure, reference will now be made to the embodiment illustrated in the figures and specific language will be used to describe them. It will nevertheless be understood that no limitation of the scope of the disclosure is thereby intended. Such alterations and further modifications in the illustrated system, and such further applications of the principles of the disclosure as would normally occur to those skilled in the art are to be construed as being within the scope of the present disclosure. It will be understood by those skilled in the art that the foregoing general description and the following detailed description are exemplary and explanatory of the disclosure and are not intended to be restrictive thereof.

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

The terms "comprise", "comprising", or any other variations thereof, are intended to cover a non-exclusive inclusion, such that one or more devices or sub-systems or elements or structures or components preceded by "comprises" a" does not, without more constraints, preclude the existence of other devices, sub-systems, additional sub-modules. Appearances of the phrase "in an embodiment", "in another embodiment" and similar language throughout this specification may, but not necessarily do, all refer to the same embodiment.

Unless otherwise defined, all technical and scientific terms used herein have the same meaning as commonly understood by those skilled in the art to which this disclosure belongs. The system, methods, and examples provided herein are only illustrative and not intended to be limiting.

A computer system (standalone, client or server computer system) configured by an application may constitute a "module" (or "subsystem") that is configured and operated to perform certain operations. In one embodiment, the "module" or "subsystem" may be implemented mechanically or electronically, so a module includes dedicated circuitry or logic that is permanently configured (within a special-purpose processor) to perform certain operations. In another embodiment, a "module" or "subsystem" may also comprise programmable logic or circuitry (as encompassed within a general-purpose processor or other programmable processor) that is temporarily configured by software to perform certain operations.

Accordingly, the term "module" or "subsystem" should be understood to encompass a tangible entity, be that an entity that is physically constructed permanently configured (hardwired) or temporarily configured (programmed) to operate in a certain manner and/or to perform certain operations described herein.

Referring now to the drawings, and more particularly to FIG. 2A through FIG. 8B, where similar reference characters denote corresponding features consistently throughout the figures, there are shown preferred embodiments and these embodiments are described in the context of the following exemplary system and/or method.

Figure 2A:
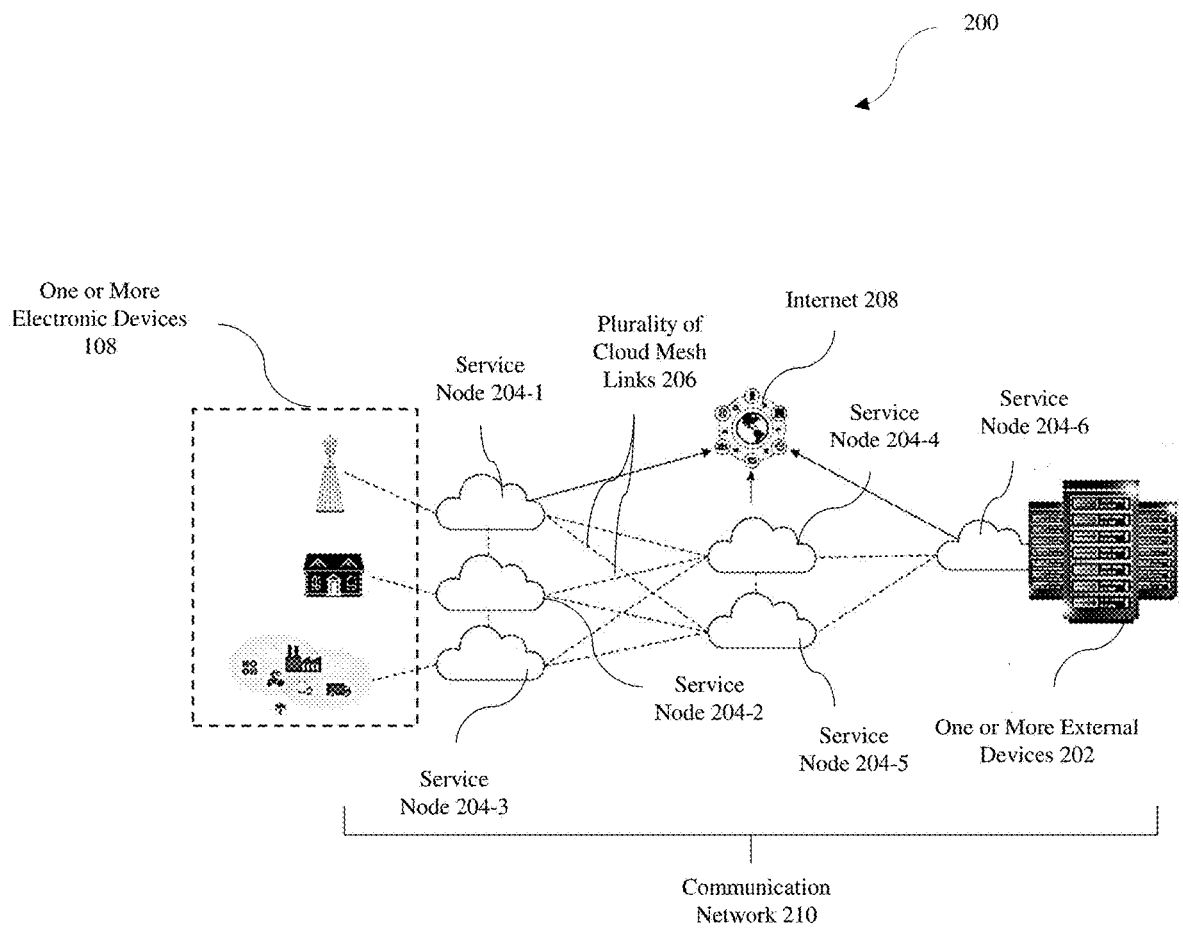
FIG. 2A is a schematic representation of an exemplary cloud infrastructure for autonomous data and signalling traffic management in a distributed infrastructure, in accordance with an embodiment of the present disclosure.

FIG. 2A is a schematic representation of an exemplary cloud system autonomous data and signalling traffic management in a distributed infrastructure, in accordance with an embodiment of the present disclosure. The cloud infrastructure 200 includes one or more external devices 202 communicatively coupled to a plurality of service nodes 204-1, 204-2, 204-3, 204-4, 204-5 . . . 204-N via a transport network. For the sake of present description, the plurality of service nodes 204-1, 204-2, 204-3, 204-4, 204-5 . . . 204-N have been represented as the plurality of service nodes 204. In an exemplary embodiment of the present disclosure, the plurality of service nodes 204 may host a set of network functions including 4G, 5G or Wi-Fi network functions, such as Mobility Management Entity (MME), Signaling Gateway (SGW), Packet Gateway (PGW), Home Subscriber Server (HSS), Policy and Charging Rules Function (PCRF), Evolved Packet Data Gateway (ePDG), Trusted Wireless Access Gateway (TWAG), Centralized Unit (CU), Access & Mobility Management Function (AMF), Session Management Function (SMF), User Plane Function (UPF), Non-3GPP Interworking Function (N3IWF), Network Data Analytics Function (NWDAF), Network Repository Functions (NRF), Network Slicing Selection Function (NSSF), Network Exposure Function (NEF), Unified Data Management (UDM), Authentication Server Function (AUSF), Point Coordination Function (PCF) and the like. In an exemplary embodiment, the one or more external devices 202 may include one or more local servers, one or more cloud servers, compute nodes, content data network, internet, the set of network functions, one or more proxy servers and the like. The one or more external devices 202 are configured to host one or more services accessible by the plurality of service nodes 204. Further, each of the plurality of service nodes 204 may act as a computing system including a plurality of modules. Details on the computing system and the plurality of modules have been elaborated in subsequent paragraphs of the present description with reference to FIG. 3. In an embodiment of the present disclosure, each of the plurality of service nodes 204 is an instance of a collective group of network functions hosted on one or more data centers. In an exemplary embodiment of the present disclosure, the one or more data centers may correspond to private cloud, public cloud, hybrid cloud and the like. Furthermore, the plurality of service nodes 204 are connected with each other via a plurality of cloud mesh links 206. The plurality of cloud mesh links 206 are secured ad hoc routing connections, such as Open Shortest Path First (OSPF) and the like between the plurality of service nodes 204. In an embodiment of the present disclosure, the plurality of service nodes 204 may include multiple physical parameters characterizing the plurality of service nodes 204 and compute one or more system parameters, such as energy requirement, power utilization, processing type, processing power, configuration and the like. Further, each of the plurality of service nodes 204 may have their own state information and characteristics, such as delay, jitter, packet flow information, protocol parameter information, quality of experience and the like, known as one or more network function parameters. In an embodiment of the present disclosure, one or more external inputs or parameters are received by a computing system via internet 208. Furthermore, the one or more system parameters, the one or more network function parameters and the one or more external inputs or parameters are one or more computing system parameters.

In an embodiment of the present disclosure, the service node 204-1, the service node 204-2 and the service node 204-3 are far edge clouds at first level of hierarchy within the cloud infrastructure 200. In an embodiment of the present disclosure, the first level of hierarchy corresponds to a first proximal distance from the one or more electronic devices 108. Further, the service node 204-4 and the service node 204-5 are regional edge clouds at second level of hierarchy within the cloud infrastructure 200. In an embodiment of the present disclosure, the second level of hierarchy corresponds to a second proximal distance from the one or more electronic devices 108. In an embodiment of the present disclosure, the service node 204-6 is closer to the one or more external devices 202. The service node 204-6 is at third level of hierarchy within the cloud infrastructure 200. In an embodiment of the present disclosure, the third level of hierarchy corresponds to a third proximal distance from the one or more electronic devices 108. In an embodiment of the present disclosure, the one or more external devices 202 may be main data center. In an embodiment of the present disclosure, each of the plurality of service nodes 204 is connected to the internet 208, as shown in FIG. 2A.

Further, the cloud infrastructure 200 includes one or more orchestrator nodes connected to the plurality of service nodes 204 via a set of cloud mesh links. In an embodiment of the present disclosure, each of the one or more orchestrator nodes is an instance of a collective group of network functions hosted on the one or more data centers. Details on the one or more orchestrator nodes have been elaborated in subsequent paragraphs of the present description with reference to FIG. 3.

Furthermore, the cloud infrastructure 200 includes one or more electronic devices 108 associated with an organization connected to a communication network 210 via a communication channel In an exemplary embodiment of the present disclosure, the communication network 210 may be private network, public network, smart city network, connected car network, Fixed Wireless Access (FWA) and the like. In an embodiment of the present disclosure, the one or more electronic devices 108 are connected to the plurality of service nodes 204. The one or more electronic devices 108 may be used by one or more users associated with the organization to access the communication network 210 for accessing one or more services hosted on the internet 208. In an embodiment of the present disclosure, the one or more external devices 202 are located nearby to the organization. In an exemplary embodiment of the present disclosure, the one or more electronic devices 108 may include a laptop computer, desktop computer, tablet computer, smartphone, wearable device, smart watch and the like. In an embodiment of the present disclosure, the one or more electronic devices 108 may also include a microprocessor, a server and the like. Further, the one or more electronic devices 108 include a local browser, a mobile application or a combination thereof. The one or more users may use a web application via the local browser, the mobile application or a combination thereof to communicate with the computing system. In an exemplary embodiment of the present disclosure, the one or more electronic devices 108 may access the computing system via a radio access network.

In an embodiment of the present disclosure, the computing system receives a request from the one or more electronic devices 108 within the communication network 210 to access the one or more services hosted on the one or more external devices 202 or a set of services hosted on the internet 208. Further, the computing system determines one or more network parameters based on the received request, one or more device parameters and the one or more computing system parameters by using a trained traffic management based Machine Learning (ML) model. The computing system also determines current network demand within the cloud infrastructure 200 based on the received request by using the trained traffic management based ML model. The computing system determines one or more service nodes at multiple levels of hierarchy within the cloud infrastructure 200 from the plurality of service nodes 204 based on the determined one or more network parameters and the determined current network demand by using the trained traffic management based ML model. In an embodiment of the present disclosure, the one or more service nodes at first level of hierarchy within the cloud infrastructure 200 are service node 204-1, service node 204-2 and service node 204-3, service node 204-4, service node 204-5 and service node 204-6. Furthermore, the computing system dynamically establishes one or more cloud mesh links between the determined one or more service nodes 204-1, 204-2, 204-3, 204-4, 204-5 and 204-6 at the multiple levels of hierarchy and the one or more external devices 202 based on the determined one or more network parameters and the current network demand by using the trained traffic management based ML model. The multiple levels of hierarchy comprises first level, second level, third level of hierarchy and the like. The computing system processes the received request by providing access of the one or more services hosted on the one or more external devices 202 to the one or more electronic devices 108 via the established one or more cloud mesh links.

Figure 2B:
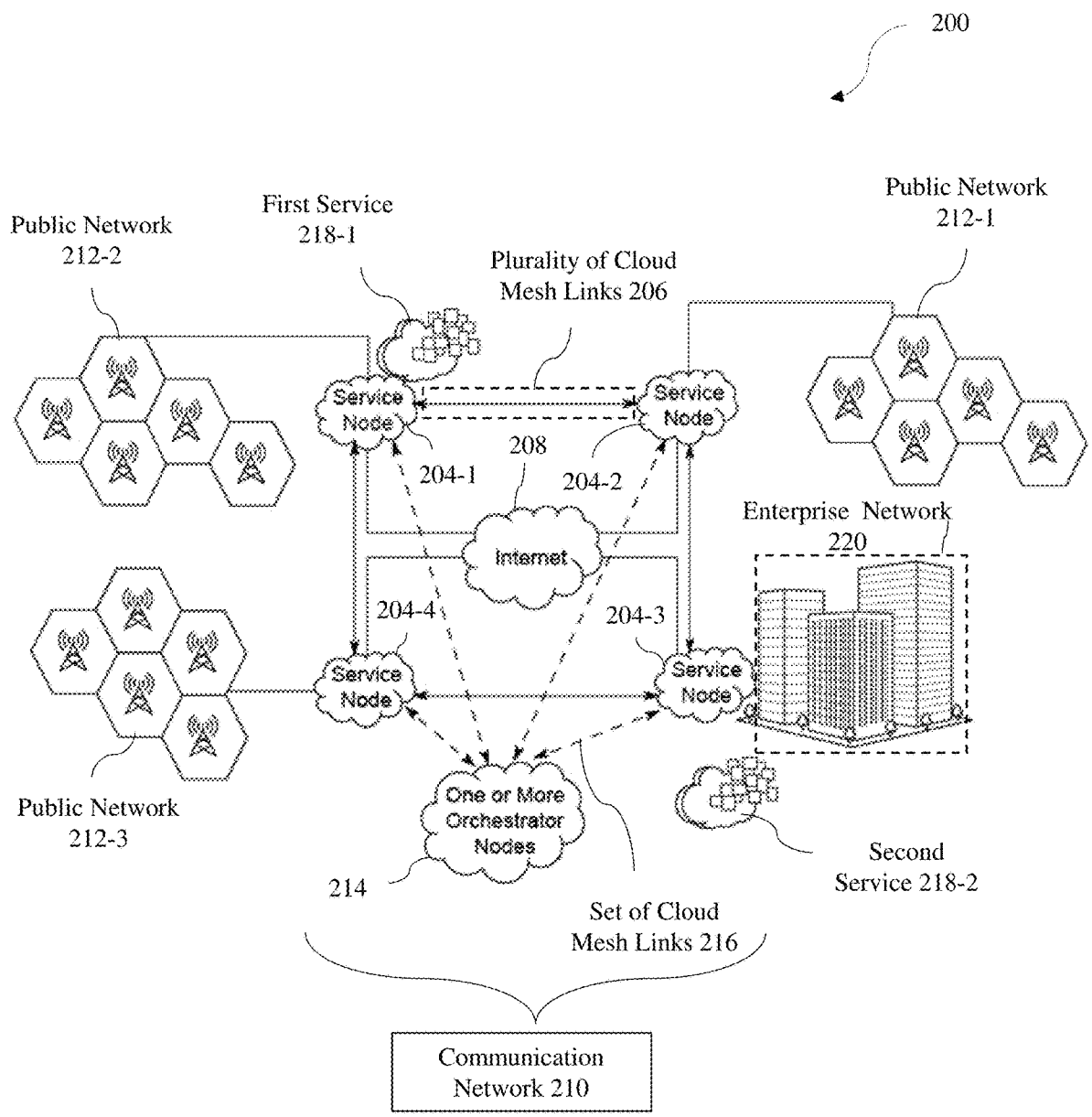
FIG. 2B is a schematic representation of the exemplary cloud infrastructure for autonomous data and signalling traffic management in the distributed infrastructure, in accordance with another embodiment of the present disclosure.

FIG. 2B is a schematic representation of an exemplary cloud infrastructure 200 for autonomous data and signalling traffic management in a distributed infrastructure, in accordance with another embodiment of the present disclosure. The cloud infrastructure 200 includes the plurality of service nodes 204-1, 204-2, 204-3 and 204-4. For the sake of present description, the plurality of service nodes 204-1, 204-2, 204-3 and 204-4 have been represented as the plurality of service nodes 204. The service node 204-3 is an enterprise cloud associated with the organization. Further, the service node 204-4 is a far edge cloud located at a distant position from the organization. The cloud infrastructure 200 includes the one or more electronic devices 108 associated with the organization connected to the communication network 210 via the communication channel In an exemplary embodiment of the present disclosure, the communication network 210 is a 4G, 5G, 6G and WiFi network with the set of network functions including multiple 4G, 5G, 6G and WiFi network functions running on variety of cloud and compute infrastructures. Furthermore, the cloud infrastructure 200 includes a first public network 212-1, a second public network 212-2 and a third public network 212-3 to communicatively couple the one or more external devices 202 to the plurality of service nodes 204. In an embodiment of the present disclosure, the second public network 212-2 is shorter public network. The plurality of service nodes 204 are connected with each other via the plurality of cloud mesh links 206 and the internet 208. Further, the one or more orchestrator nodes 214 are connected to the plurality of service nodes 204 via a set of cloud mesh links 216. The one or more external devices 202 host a first service 218-1 and a second service 218-2 accessible by the plurality of service nodes 204. In an embodiment of the present disclosure, the plurality of service nodes 204 may also be communicatively coupled with one or more operator networks to achieve seamless integration of the one or more electronic devices 108 with the one or more operator networks.

Figure 3:
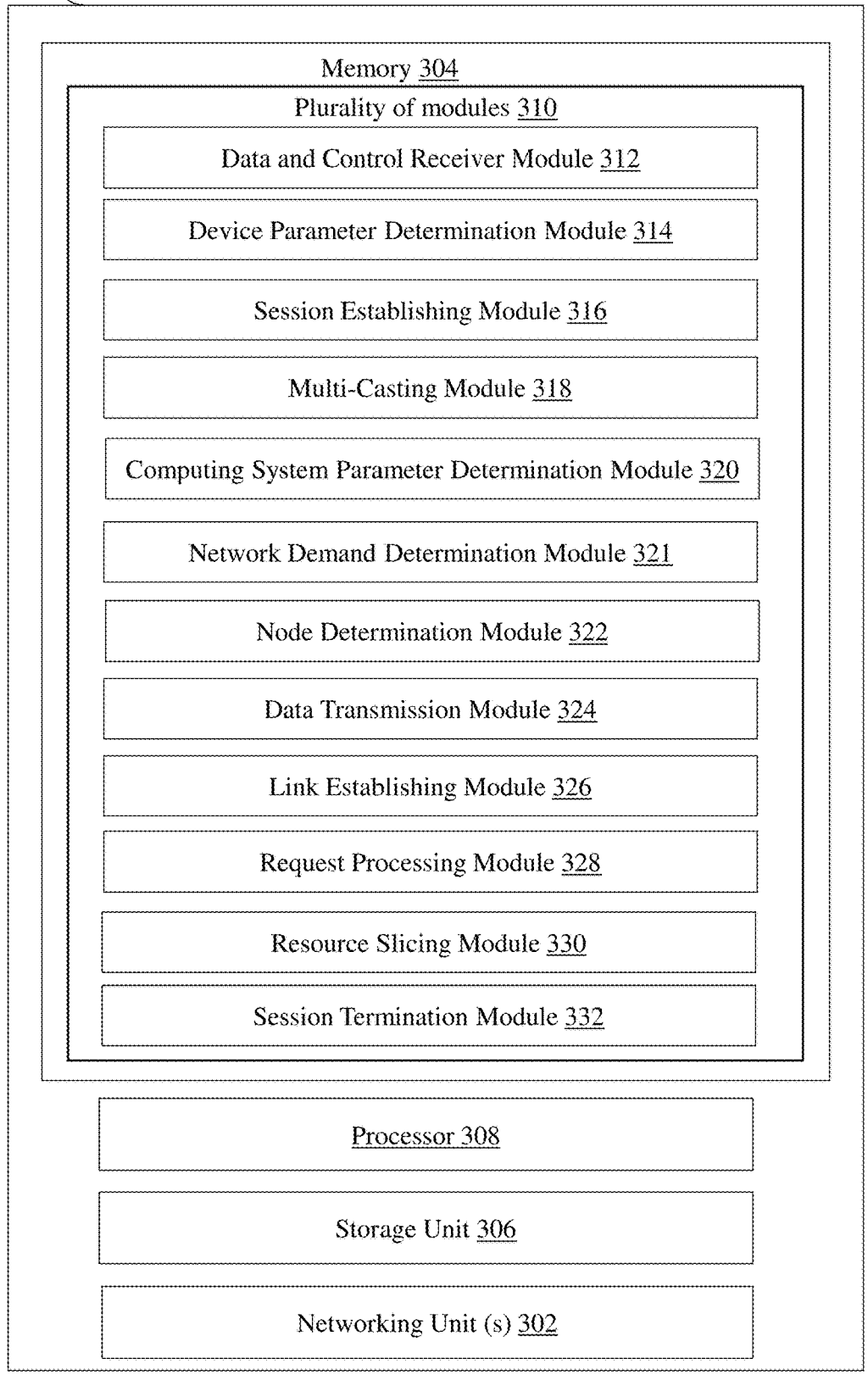
FIG. 3 is a block diagram illustrating an exemplary computing system for autonomous data and signalling traffic management in the distributed infrastructure, in accordance with an embodiment of the present disclosure.

FIG. 3 is a block diagram illustrating an exemplary computing system 300 for autonomous data and signalling traffic management in a distributed infrastructure, in accordance with an embodiment of the present disclosure. In an embodiment of the present disclosure, the computing system 300 corresponds to a service node from the plurality of service nodes 204. In an embodiment of the present disclosure, the service node is an instance of the collective group of the network functions hosted on the one or more data centers. The service node may be hosted locally, across multiple systems or multi-cloud. In an exemplary embodiment of the present disclosure, the one or more data centers may correspond to private cloud, public cloud, hybrid cloud and the like. Furthermore, the plurality of service nodes 204 are connected with each other via the plurality of cloud mesh links 206. The plurality of cloud mesh links 206 are secured ad hoc routing connections, such as Open Shortest Path First (OSPF) and the like between the plurality of service nodes 204. Further, the computing system 300 includes one or more networking units 302, one or more high performance processors, a memory 304 and a storage unit 306. The one or more networking units 302, the one or more high performance processors, the memory 304 and the storage unit 306 are communicatively coupled through a processor 308 or any similar mechanism. The memory 304 comprises the plurality of modules 310 in the form of programmable instructions executable by the one or more networking units 302 and the one or more high performance processors. Further, the plurality of modules 310 includes a data and receiver module 312, a device parameter determination module 314, a session establishing module 316, a multicasting module 318, a computing system parameter determination module 320, a network demand determination module 321, a node determination module 322, a data transmission module 324, a link establishing module 326, a request processing module 328, resource slicing module 330 and a session termination module 332.

The one or more networking units 302, as used herein, means any type of computational circuit, such as, but not limited to, a microprocessor unit, microcontroller, complex instruction set computing microprocessor unit, reduced instruction set computing microprocessor unit, very long instruction word microprocessor unit, explicitly parallel instruction computing microprocessor unit, graphics processing unit, digital signal processing unit, or any other type of processing circuit. The one or more networking units 302 may also include embedded controllers, such as generic or programmable logic devices or arrays, application specific integrated circuits, single-chip computers, and the like.

The memory 304 may be non-transitory volatile memory and non-volatile memory. The memory 304 may be coupled for communication with the one or more networking units 302, such as being a computer-readable storage medium. The one or more networking units 302 may execute machine-readable instructions and/or source code stored in the memory 304. A variety of machine-readable instructions may be stored in and accessed from the memory 304. The memory 304 may include any suitable elements for storing data and machine-readable instructions, such as read only memory, random access memory, erasable programmable read only memory, electrically erasable programmable read only memory, a hard drive, a removable media drive for handling compact disks, digital video disks, diskettes, magnetic tape cartridges, memory cards, and the like. In the present embodiment, the memory 304 includes the plurality of modules 310 stored in the form of machine-readable instructions on any of the above-mentioned storage media and may be in communication with and executed by the one or more networking units 302.

The storage unit 306 may be a cloud storage. The storage unit 306 may store address of the one or more external devices 202, the one or more computing system parameters and the one or more device parameters. The storage unit 306 may also store one or more network parameters, one or more mesh parameters, one or more security parameters, one or more environmental parameters and control information.

The data and control receiver module 312 is configured to receive a request from the one or more electronic devices 108 within the communication network 210 to access the one or more services hosted on the one or more external devices 202 or the set of services hosted on the internet 208. In an exemplary embodiment of the present disclosure, the one or more services may include YouTube, Netflix, Facebook and the like. In an exemplary embodiment of the present disclosure, the one or more electronic devices 108 may include a laptop computer, desktop computer, tablet computer, smartphone, wearable device, smart watch and the like. Further, the request includes address of the one or more external devices 202. In an exemplary embodiment of the present disclosure, the one or more external devices 202 may include one or more local servers, one or more cloud servers, one or more proxy servers, the set of network functions, compute nodes, content data network, internet and the like. In an embodiment of the present disclosure, the set of network functions may be one or more virtualized network functions or containerized application.

The device parameter determination module 314 is configured to determine the one or more device parameters associated with the one or more electronic devices 108 and the one or more external devices 202 based on the received request. In an exemplary embodiment of the present disclosure, the one or more device parameters include type of network associated with the one or more electronic devices 108, type of the one or more electronic devices 108, type of the one or more external devices 202, type of the one or more services associated with the one or more external devices 202 and location of the one or more electronic devices 108. In an exemplary embodiment of the present disclosure, the type of network associated with the one or more electronic devices 108 include public network and private network. Further, the type of the one or more electronic devices 108 include secured device, unsecured device and the like.

The session establishing module 316 is configured to establish a secure real time communication session with the one or more electronic devices 108 and the plurality of service nodes 204 based on the received request and the determined one or more device parameters. The plurality of service nodes 204 are connected with each other via the plurality of cloud mesh links 206. In an embodiment of the present disclosure, the plurality of cloud mesh links 206 are secured ad hoc routing connections, such as Open Shortest Path First (OSPF) and the like between the plurality of service nodes 204. The plurality of cloud mesh links 206 forms an ad-hoc network using connectivity of underlying networking architecture. In an embodiment of the present disclosure, each of the plurality of cloud mesh links 206 periodically re-new one or more security association parameters, such that each of the plurality of cloud mesh links 206 may exit association with the plurality of service nodes 204 upon failure in renewing the one or more security association parameters with algorithms, such as Keyed-Hashing for Message Authentication-Secure Hash Algorithm-1 (HMAC-SHA-1) and the like. The plurality of cloud mesh links 206 are encrypted via one or more encryption techniques. In an exemplary embodiment of the present disclosure, the one or more encryption techniques include IP Security (IPSEC), Blockchain and the like. In an embodiment of the present disclosure, the plurality of cloud mesh links 206 form many to many connection amongst the plurality of service nodes 204. Further, the plurality of cloud mesh links 206 apply fisheye technique on the plurality of service nodes 204 to frequently update data in nearby service nodes and infrequently update data in farther nodes. The nearby nodes are smaller hops away and the farther nodes are larger hops away. The plurality of service nodes 204 establishes a secure communication network between the plurality of service nodes 204 associated with the organization and one or more service nodes associated with other organizations via cloud mesh links. In an embodiment of the present disclosure, the establishment of the secure communication network allows seamless integration with operator network while keeping data associated with the organization, such as control information, machine learned data and the like within the communication network 210. In an embodiment of the present disclosure, the plurality of service nodes 204 may work in a pooled mode. In the pooled mode, the plurality of service nodes 204 work as a single system. In an embodiment of the present disclosure, the plurality of service nodes 204 may span across multiple hybrid clouds. The plurality of service nodes 204 may abstract underlying distributed network. In an embodiment of the present disclosure, the plurality of service nodes 204 may be a large core running on distributed computes. Further, the plurality of service nodes 204 may add an additional instance dynamically to increase the network. In an exemplary embodiment of the present disclosure, the plurality of service nodes 204 include Access & Mobility Management Function (AMF), Session Management Function (SMF), User Plane Function (UPF), Network Slicing Selection Function (NSSF), Network Repository Functions (NRF), Point Coordination Function (PCF), Network Slicing Selection Function (NSSF), Unified Data Management (UDM), User Defined Routes (UDR), Authentication Server Function (AUSF), Non-3GPP Interworking Function (N3IWF), Mobility Management Entity (MME), Signaling Gateway (SGW), Packet Gateway (PGW), Policy and Charging Rules Function (PCRF), Home Subscriber Server (HSS), SGi services and the like. In an embodiment of the present disclosure, the plurality of service nodes 204 obtain Radio Access Network (RAN) awareness via open Application programming Interface (API) and enable intelligent services across multi-Radio Access Technology (RAT), such as 4G, 5G, Wi-Fi and the like. In an embodiment of the present disclosure, the RAN information may be obtained from Self Organizing Network (SON), such as RAN Intelligent Controller (RIC) for making smart ML based decisions. In an embodiment of the present disclosure, the plurality of service nodes 204 provide distributed and disaggregated one or more microservices for multiple elements of packet core network. In an exemplary embodiment of the present disclosure, the one or more microservices include mobility management, session management, transport management, data management, subscriber management and the like. In establishing the secure real time communication session with the one or more electronic devices 108 and the plurality of service nodes 204 based on the received request and the determined one or more device parameters, the session establishing module 316 obtains one or more mesh parameters, such as link capacity, delay, bandwidth and the like and one or more security parameters for authentication and encryption and the like based on the received request and the determined one or more device parameters. Further, the session establishing module 316 establishes the secure real time communication session with the one or more electronic devices 108 and the plurality of service nodes 204 based on the obtained one or more mesh parameters and the obtained one or more security parameters.

The multi-casting module 318 is configured to broadcast one or more handshake messages to each of the plurality of service nodes 204 upon establishing the secure real time communication session. For example, the one or more handshake messages may be HELLO messages. In an embodiment of the present disclosure, the one or more handshake messages are broadcasted to each of the plurality of service nodes 204 via the plurality of cloud mesh links 206. In an exemplary embodiment of the present disclosure, the one or more handshake messages include information corresponding to CPU load, networking load, applications peered corresponding to each of the plurality of service nodes 204, environment information, control information, additional node properties and the like. In an embodiment of the present disclosure, each of the plurality of service nodes 204 periodically broadcasts the one or more handshake messages to indicate change in one or more environmental parameters in topology. In an exemplary embodiment of the present disclosure, the one or more environmental parameters include cost of electricity during various time intervals, temperature in data centers, cost of computing during various time intervals, traffic during various time intervals, Radio Access Networks (RANs) being served, tracking areas served, latencies and the like. Each of the plurality of service nodes 204 acknowledges the received broadcasted one or more handshake messages. In an embodiment of the present disclosure, the one or more handshake messages may flow outside the plurality of cloud mesh links 206 to convey similar information, such as Central processing Unit (CPU) load, networking load and the like.

The computing system parameter determination module 320 is configured to determine the one or more network parameters associated with the established secure real time communication session based on the received request, the one or more device parameters, one or more computing system parameters and one or more responses received for the broadcasted one or more handshake messages from the plurality of service nodes 204 by using a trained traffic management based Machine Learning (ML) model. In an embodiment of the present disclosure, the plurality of service nodes 204 may include multiple physical parameters characterizing the plurality of service nodes 204 and compute one or more system parameters, such as energy requirement, power utilization, processing type, processing power and the like. Further, each of the plurality of service nodes 204 may have their own state information and characteristics, such as delay, jitter, packet flow information, protocol parameter information, quality of experience and the like, known as one or more network function parameters. In an embodiment of the present disclosure, one or more external inputs or parameters are received by the computing system 300 via internet 208. Furthermore, the one or more system parameters, the one or more network function parameters and the one or more external inputs or parameters are the one or more computing system parameters. In an exemplary embodiment of the present disclosure, the one or more network parameters include routing information, control information, tree topology, cost to reach each of the plurality of service nodes 204, resiliency requirement, applications peered to each of the plurality of service nodes 204, a set of services peered to each of the plurality of service nodes 204 and the like. The one or more responses received for the broadcasted one or more handshake messages include CPU load, networking load, applications peered corresponding to each of the plurality of service nodes 204 and the like. In an embodiment of the present disclosure, the determination of the one or more network parameters allows appropriate routing of application specific traffic to the plurality of service nodes 204. In one embodiment of the present disclosure, configured means static configuration, learnt configuration, predicted topology and parameters using ML based data models and the like.

The network demand determination module 321 is configured to determine current network demand within the cloud infrastructure 200 based on the received request by using the trained traffic management based ML model. In an embodiment of the present disclosure, the determined current network demand corresponds to one or more external parameters.

The node determination module 322 is configured to determine one or more service nodes 204-1, 204-2, 204-3, 204-4, 204-5, 204-6 at multiple levels of hierarchy within the cloud infrastructure 200 from the plurality of service nodes 204 based on the determined one or more network parameters and the determined current network demand by using the trained traffic management based ML model. In an embodiment of the present disclosure, the multiple levels of hierarchy include a first level of hierarchy, a second level of hierarchy and a third level of hierarchy and the like. The first level of hierarchy corresponds to a first proximal distance from the one or more electronic devices 108. Further, the second level of hierarchy corresponds to a second proximal distance from the one or more electronic devices. Further, the third level of hierarchy corresponds to a third proximal distance from the one or more electronic devices. In determining the one or more service nodes 204-1, 204-2, 204-3, 204-4, 204-5, 204-6 at multiple levels of hierarchy within the cloud infrastructure 200 from the plurality of service nodes 204 based on the determined one or more network parameters and the determined current network demand by using the trained traffic management based ML model, the node determination module 322 determines one or more node parameters corresponding to the plurality of service nodes 204 based on the determined one or more network parameters, the determined current network demand and the received request by using the trained traffic management based ML model. In an exemplary embodiment of the present disclosure, the one or more node parameters include zone of each of the plurality of service nodes 204, availability of each of the plurality of services nodes 204, distance between the plurality of service nodes 204 and the one or more electronic devices 108, distance between the plurality of service nodes 204 and the one or more external devices 202 and the like. Further, the node determination module 322 correlates the determined one or more node parameters with the determined one or more network parameters and the determined current network demand by using the trained traffic management based ML model. The node determination module 322 determines the one or more service nodes 204-1, 204-2, 204-3, 204-4, 204-5, 204-6 at the multiple levels of hierarchy within the cloud infrastructure 200 from the plurality of service nodes 204 proximal to the one or more electronic devices 108 and the one or more external devices 202 based on result of correlation.

In an embodiment of the present disclosure, the node determination module 322 determines best possible service node among the one or more service nodes 204-1, 204-2, 204-3, 204-4, 204-5, 204-6 at multiple levels of hierarchy within the cloud infrastructure 200 capable of processing the received request based on the determined one or more network parameters, the determined current network demand and the determined one or more node parameters by using the trained traffic management based ML model. In an embodiment of the present disclosure, it may be ensured that there are no traffic loops or ping pongs of the traffic while processing the received request at the determined best possible node. The node determination module 322 leverages local or cloud computing seamlessly and pairs the one or more external devices 202 with nearest cloud egress by using the trained traffic management based ML model. In determining the best possible service node capable of processing the received request, the node determination module 322 identifies node configuration of each of the plurality of service nodes 204 present in the established secure real time communication session based on the determined one or more responses received for the broadcasted one or more handshake messages from the plurality of service nodes 204. Further, the node determination module 322 applies the identified node configuration, the determined one or more network parameters and the determined one or more node parameters to the trained traffic management based ML model. The node determination module 322 selects the best possible node based on the result of application. In an embodiment of the present disclosure, each of the plurality of service nodes 204 may determine traffic type associated with the one or more electronic devices 108 and best possible service node for the determined traffic type by using the trained traffic management based ML model for processing the request. When the best possible service node may not be peered to the one or more services directly, the best possible service node may use hop by hop routing to transmit the request to most appropriate service node for processing the request.

The data transmission module 324 receives the one or more mesh parameters, the one or more security parameters, the one or more environmental parameters and the control information from the plurality of service nodes 204 via the one or more orchestrator nodes 214. In an embodiment of the present disclosure, the one or more orchestrator nodes 214 are connected to the plurality of service nodes 204 via the set of cloud mesh links 216. In embodiment of the present disclosure, each of the one or more orchestrator nodes 214 is an instance of a collective group of network functions hosted on the one or more data centers. The one or more orchestrator nodes 214 may be hosted locally, across multiple systems or multi-cloud. Further, the data transmission module 324 transmits the collected one or more mesh parameters, the collected one or more security parameters, the collected one or more environmental parameters and the collected control information to each of the plurality of service nodes 204 via the one or more orchestrator nodes 214. In an embodiment of the present disclosure, the one or more orchestrator nodes 214 act as a higher-level logic for receiving and transmitting the one or more mesh parameters, the one or more security parameters, the one or more environmental parameters and the control information to each of the plurality of service nodes 204. Further, the one or more orchestrators may include a set of orchestrator nodes to store a big picture view of the plurality of service nodes 204 or network of networks. The one or more orchestrator nodes 214 seed the plurality of cloud mesh links 206 and notifies the plurality of mesh links about location of each of the plurality of service nodes 204, such that the plurality of service nodes 204 may communicate with each other. Thus, the plurality of cloud mesh links 206 may be partitioned, such that the plurality of mesh links may not become too large based on the one or more environmental parameters. In an embodiment of the present disclosure, the one or more orchestrator nodes 214 push one or more sharing parameters when multiple parities including operators and enterprise share the same plurality of service nodes 204. The plurality of service nodes 204 along with the plurality of cloud mesh links 206 and the one or more orchestrator nodes 214 form autonomous network elements to facilitate autonomous communications between the one or more data centers. In an embodiment of the present disclosure, the one or more orchestrator nodes 214 facilitate automatic addition of a set of service nodes in the network for scaling the plurality of service nodes 204. The plurality of service nodes 204 determine whether traffic type and service type corresponding to each of the plurality of service nodes 204 are malicious by using the trained traffic management based ML model. In an embodiment of the present disclosure, transmission of the malicious traffic to the plurality of service nodes 204 is terminated upon determining that the determined traffic type and service type are malicious. In an exemplary embodiment of the present disclosure, the traffic type and the service type may be malicious due to one or more cybersecurity attacks, such as Distributed Denial of Service (DDOS), virus, botnet, rogue applications and the like. In an embodiment of the present disclosure, one or more orchestrator nodes 214 are notified about the malicious traffic type and the malicious service type, such that the one or more orchestrator nodes 214 may notify each of the plurality of service nodes 204 about the malicious traffic type and the malicious service type. The plurality of service nodes 204 detect one or more issues associated with each of the plurality of service nodes 204. In an exemplary embodiment of the present disclosure, the one or more issues include faults, failures and the one or more environmental parameters in the plurality of service nodes 204. The plurality of service nodes 204 distribute traffic to other service nodes without the one or more issues upon detecting the one or more issues associated with the plurality of service nodes 204. Furthermore, roaming instances of the plurality of service nodes 204 may be instantiated on roaming zones to minimize roaming related network costs. In an embodiment of the present disclosure, the roaming instances associated the plurality of service nodes 204 are connected with home instances associated with the plurality of service nodes 204 via multiple cloud mesh links. This connection of the roaming instances with the home instances allows home operator to locally terminate traffic and minimize roaming network costs.

The link establishing module 326 is configured to dynamically establish one or more cloud mesh links between the determined one or more service nodes 204-1, 204-2, 204-3, 204-4, 204-5, 204-6 at the multiple levels of hierarchy and the one or more external devices 202 based on the determined one or more network parameters and the determined current network demand by using the trained traffic management based ML model. In an embodiment of the present disclosure, the one or more cloud mesh links are secured ad hoc routing connections, such as Open Shortest Path First (OSPF) and the like encrypted via the one or more encryption techniques. In an exemplary embodiment of the present disclosure, the one or more encryption techniques include IP Security (IPSEC), Blockchain and the like. In dynamically establishing the one or more cloud mesh links between the determined one or more service nodes 204-1, 204-2, 204-3, 204-4, 204-5, 204-6 at multiple levels of hierarchy and the one or more external devices 202 based on the determined one or more network parameters and the determined current network usage by using the trained traffic management based ML model, the link establishing module 326 determines an optimal communication path with the determined one or more service nodes 204-1, 204-2, 204-3, 204-4, 204-5, 204-6 at multiple levels of hierarchy to reach the one or more external devices 202 based on the determined one or more network parameters, the determined current network demand and the determined one or more node parameters by using the trained traffic management based ML model. Further, the link establishing module 326 sends a request to each of the determined one or more service nodes 204-1, 204-2, 204-3, 204-4, 204-5, 204-6 at multiple level of hierarchy. The link establishing module 326 obtains acknowledgement of the sent request from each of the determined one or more service nodes 204-1, 204-2, 204-3, 204-4, 204-5, 204-6 at multiple level of hierarchy. Furthermore, the link establishing module 326 dynamically establishes the one or more cloud mesh links between the determined one or more service nodes 204-1, 204-2, 204-3, 204-4, 204-5, 204-6 at multiple level of hierarchy based on the determined optimal communication path, the determined one or more network parameters, the determined current network demand and the determined one or more node parameters by using the trained traffic management based ML model upon obtaining the acknowledgment from each of the determined one or more service nodes 204-1, 204-2, 204-3, 204-4, 204-5, 204-6 at multiple levels of hierarchy.

The request processing module 328 is configured to process the received request by providing access of the one or more services hosted on the one or more external devices 202 to the one or more electronic devices 108 via the established one or more cloud mesh links. In an exemplary embodiment of the present disclosure, processing the request include providing access of the one or more services hosted on the one or more external devices 202 to the one or more external devices 202 via the established one or more cloud mesh links, running the one or more services on the one or more electronic devices 108 within the communication network 210, securely streaming content of the one or more services onto the one or more electronic devices 108 with restrictive access, providing access of the one or more external devices 202 to the one or more electronic devices 108, facilitating communication between the one or more electronic devices 108 and the one or more external devices 202 and the like.

The resource slicing module 330 slices the one or more service nodes 204-1, 204-2, 204-3, 204-4, 204-5, 204-6 at multiple levels of hierarchy based on predefined sharing arrangements. Further, the slicing module allocates the sliced one or more service nodes 204-1, 204-2, 204-3, 204-4, 204-5, 204-6 at the multiple level of hierarchy to each of the one or more users for processing the received request based on the predefined sharing arrangements.

The session termination module 332 is configured to terminate the established secure real time communication session after the received request is processed.

Figure 4:
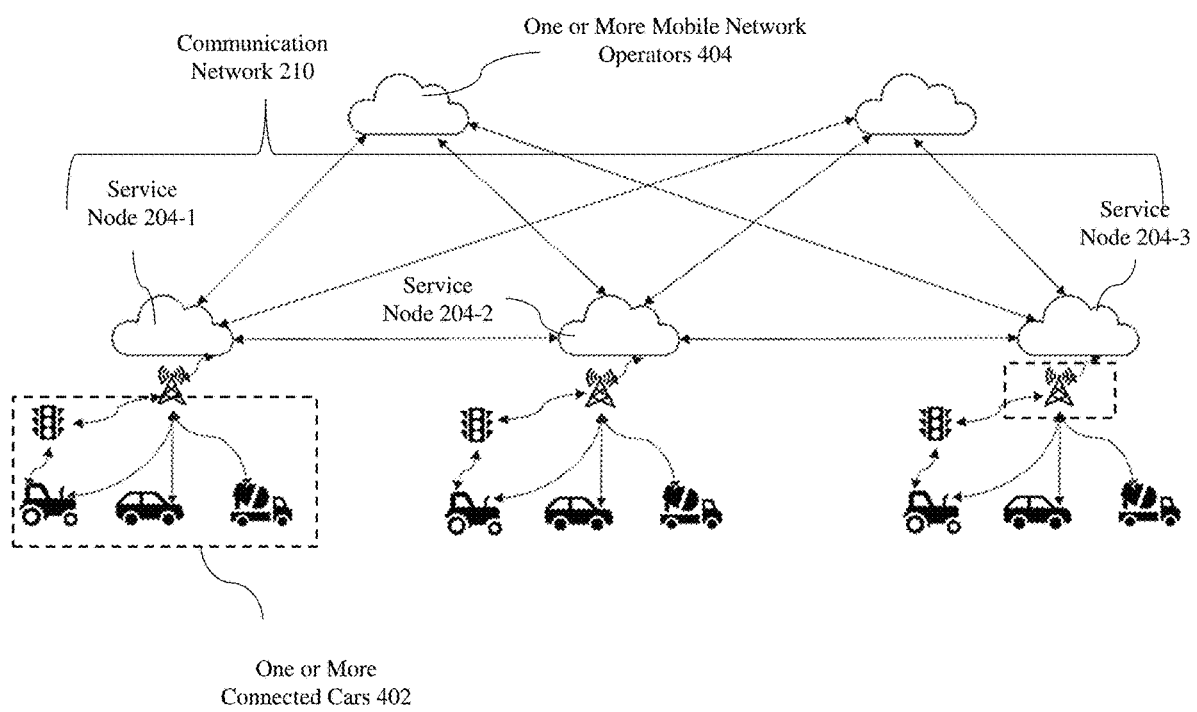
FIG. 4 is a schematic representation illustrating an exemplary operation of the computing system with the help of a use-case scenario, in accordance with an embodiment of the present disclosure.

FIG. 4 is a schematic representation illustrating an exemplary operation of the computing system 300 with the help of a use-case scenario, in accordance with an embodiment of the present disclosure. In the current scenario, the one or more electronic devices 108 i.e., one or more connected cars 402 request access of the one or more services, such as road maps, weather forecasts and the like via the communication network 210. FIG. 4 illustrates three service nodes i.e., the service node 204-1, the service node 204-2 and the service node 204-3 connected with one or more mobile network operators 404 via the plurality of cloud mesh links 206. In the present scenario, service node 204-1 acts as the computing system 300. The computing system 300 receives the request from the one or more connected cars via the communication network 210. Further, the computing system 300 determine the one or more network parameters based on the received request, the one or more device parameters and the one or more computing system parameters by using the trained traffic management based Machine Learning (ML) model. The computing system 300 also determines the current network demand within the cloud infrastructure 200 based on the received request by using the trained traffic management based ML model. The computing system 300 determines the one or more service nodes 204-1, 204-2 at the multiple levels of hierarchy within the cloud infrastructure 200 from the plurality of service nodes 204 based on the determined one or more network parameters and the determined current network demand by using the trained traffic management based ML model. Further, the computing system 300 dynamically establishes the one or more cloud mesh links between the determined one or more service nodes 204-1, 204-2 and the one or more mobile network operators based on the determined one or more network parameters and the determined current network demand by using the trained traffic management based ML model. The computing system 300 processes the received request by providing access of the one or more services hosted on the one or more mobile network operators to the one or more electronic devices 108 via the established one or more cloud mesh links. Furthermore, when the one or more connected cars move from one location to another location, the one or more connected cars may switch connection from the service node 204-1 to the service node 204-2. Thus, the computing system 300 provides seamless connection between the one or more connected cars and the one or more mobile network operators.

Figure 5:
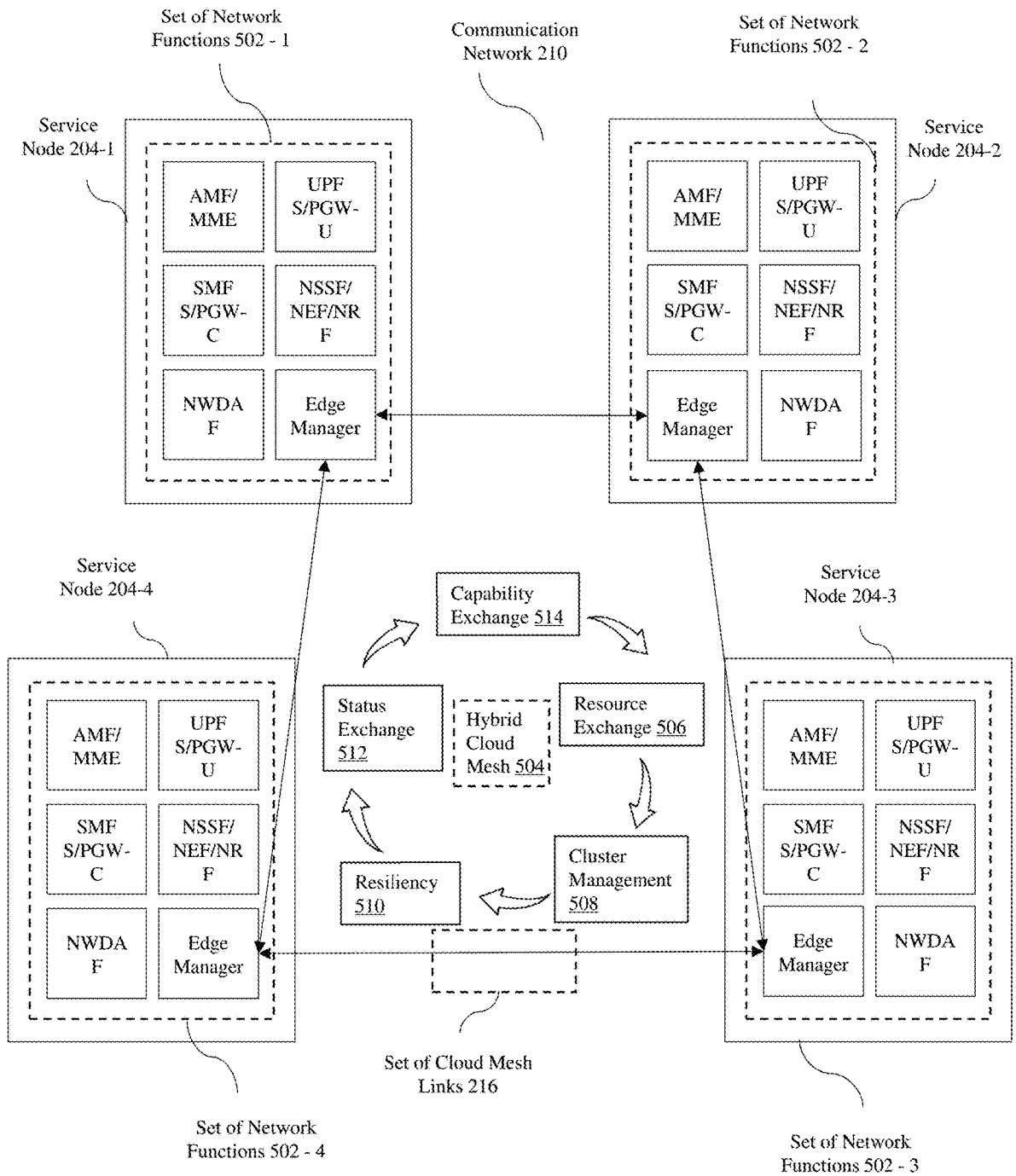
FIG. 5 is an exemplary schematic representation of a distributed core with cloud mesh link for autonomous data and signalling traffic management in the distributed infrastructure, in accordance with an embodiment of the present disclosure.

FIG. 5 is an exemplary schematic representation of a distributed core with cloud mesh link for autonomous data and signalling traffic management in the distributed infrastructure, in accordance with an embodiment of the present disclosure. In an embodiment of the present disclosure, the distributed core includes the plurality of service nodes 204-1, 204-2, 204-3 and 204-4. For the sake of present description, the plurality of service nodes 204-1, 204-2, 204-3 and 204-4 have been represented as the plurality of service nodes 204. In an embodiment of the present disclosure, the service node 204-1 includes set of network functions 502-1, the service node 204-2 includes set of network functions 502-2, the service node 204-3 includes set of network functions 502-3 and the service node 204-4 includes set of network functions 502-4. In an exemplary embodiment of the present disclosure, each set of network functions 502-1, 502-2, 502-3, 502-4 include AMF, MME, UPFS, PGW-U, SMFS, PGWC, NSSF, NEF, NFR, NWDAF and edge manager. Further, the plurality of service nodes 204 are connected with each other via the edge manager associated with the set of network functions 502-1, 502-2, 502-3, 502-4, as shown in FIG. 5. In an embodiment of the present disclosure, the edge manager corresponding to each set of network functions 502-1, 502-2, 502-3, 502-4 are connected with each other via the set of cloud mesh links 216. The set of cloud mesh links 216 form a hybrid cloud mesh 504 for performing resource exchange 506, cluster management 508, resiliency 510, status exchange 512, capability exchange 514 and the like. In an embodiment the edge managers co-ordinate with each other to determine the best location for processing the data and control workloads using ML algorithms with external data, computing system data, network load, environmental and protocol data and the like. In an embodiment the edge managers co-ordinate with each other and use ML algorithms to predict the need for resource reallocation or traffic steering, elastic scaling of the system and energy saving and the like. In an embodiment the edge managers perform partial network function role to facilitate the computing system optimization and performance improvements.

Figure 6:
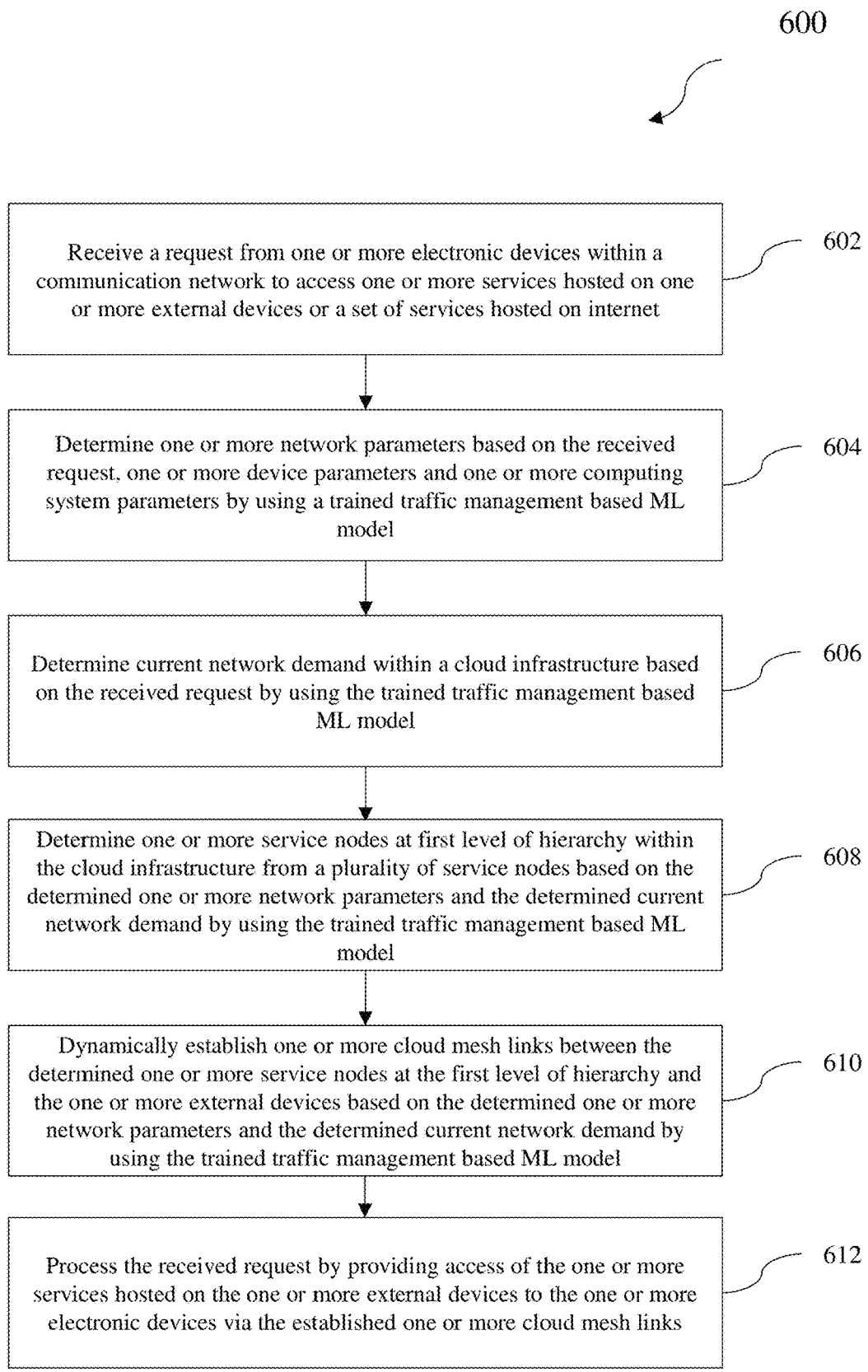
FIG. 6 is a process flow diagram illustrating an exemplary method for autonomous data and signalling traffic management in the distributed infrastructure, in accordance with an embodiment of the present disclosure.

FIG. 6 is a process flow diagram illustrating an exemplary method 600 for autonomous data and signalling traffic management in a distributed infrastructure, in accordance with an embodiment of the present disclosure. In an embodiment of the present disclosure, the method 600 is performed by a service node from a plurality of service nodes 204. In an embodiment of the present disclosure, the service node is an instance of the collective group of network functions hosted on one or more data centers. The service node may be hosted locally, across multiple systems or multi-cloud. In an exemplary embodiment of the present disclosure, the one or more data centers may correspond to private cloud, public cloud, hybrid cloud and the like. Furthermore, the plurality of service nodes 204 are connected with each other via a plurality of cloud mesh links 206. The plurality of cloud mesh links 206 are secured ad hoc routing connections, such as Open Shortest Path First (OSPF) and the like between the plurality of service nodes 204. At step 602, a request is received from one or more electronic devices 108 within a communication network 210 to access one or more services hosted on one or more external devices 202 or a set of services hosted on internet 208. In an exemplary embodiment of the present disclosure, the one or more services may include YouTube, Netflix, Facebook and the like. In an exemplary embodiment of the present disclosure, the one or more electronic devices 108 may include a laptop computer, desktop computer, tablet computer, smartphone, wearable device, smart watch and the like. Further, the request includes address of the one or more external devices 202. In an exemplary embodiment of the present disclosure, the one or more external devices 202 may include one or more local servers, one or more cloud servers, one or more proxy servers, a set of network functions, compute nodes, content data network, internet and the like. In an embodiment of the present disclosure, the set of network functions may be one or more virtualized network functions or containerized application. In an exemplary embodiment of the present disclosure, the plurality of service nodes 204 may host the set of network functions including 4G, 5G or Wi-Fi network functions, such as Mobility Management Entity (MME), Signaling Gateway (SGW), Packet Gateway (PGW), Home Subscriber Server (HSS), Policy and Charging Rules Function (PCRF), Evolved Packet Data Gateway (ePDG), Trusted Wireless Access Gateway (TWAG), Centralized Unit (CU), Access & Mobility Management Function (AMF), Session Management Function (SMF), User Plane Function (UPF), Non-3GPP Interworking Function (N3IWF), Network Data Analytics Function (NWDAF), Network Repository Functions (NRF), Network Slicing Selection Function (NSSF), Network Exposure Function (NEF), Unified Data Management (UDM), Authentication Server Function (AUSF), Point Coordination Function (PCF) and the like.

Further, the method 600 includes determining one or more device parameters associated with the one or more electronic devices 108 and the one or more external devices 202 based on the received request. In an exemplary embodiment of the present disclosure, the one or more device parameters include type of network associated with the one or more electronic devices 108, type of the one or more electronic devices 108, type of the one or more external devices 202, type of the one or more services associated with the one or more external devices 202 and location of the one or more electronic devices 108. In an exemplary embodiment of the present disclosure, the type of network associated with the one or more electronic devices 108 include public network and private network. Further, the type of the one or more electronic devices 108 include secured device, unsecured device and the like.

Furthermore, the method 600 includes establishing a secure real time communication session with the one or more electronic devices 108 and the plurality of service nodes 204 based on the received request and the determined one or more device parameters. The plurality of service nodes 204 are connected with each other via the plurality of cloud mesh links 206. In an embodiment of the present disclosure, the plurality of cloud mesh links 206 are secured ad hoc routing connections, such as Open Shortest Path First (OSPF) and the like between the plurality of service nodes 204. The plurality of cloud mesh links 206 forms an ad-hoc network using connectivity of underlying networking architecture. In an embodiment of the present disclosure, each of the plurality of cloud mesh links 206 periodically re-new one or more security association parameters, such that each of the plurality of cloud mesh links 206 may exit association with the plurality of service nodes 204 upon failure in renewing the one or more security association parameters with algorithms, such as Keyed-Hashing for Message Authentication-Secure Hash Algorithm-1 (HMAC-SHA-1) and the like. The plurality of cloud mesh links 206 are encrypted via one or more encryption techniques. In an exemplary embodiment of the present disclosure, the one or more encryption techniques include IP Security (IPSEC), Blockchain and the like. In an embodiment of the present disclosure, the plurality of cloud mesh links 206 form many to many connection amongst the plurality of service nodes 204. Further, the plurality of cloud mesh links 206 apply fisheye technique on the plurality of service nodes 204 to frequently update data in nearby service nodes and infrequently update data in farther nodes. The nearby nodes are smaller hops away and the farther nodes are larger hops away. The plurality of service nodes 204 establishes a secure communication network between the plurality of service nodes 204 associated with the organization and one or more service nodes associated with other organizations via cloud mesh links. In an embodiment of the present disclosure, the establishment of the secure communication network allows seamless integration with operator network while keeping data associated with the organization, such as control information, machine learned data and the like within the communication network 210, such as local or enterprise clouds. In an embodiment of the present disclosure, the plurality of service nodes 204 may work in a pooled mode. In the pooled mode, the plurality of service nodes 204 work as a single system. In an embodiment of the present disclosure, the plurality of service nodes 204 may span across multiple hybrid clouds. The plurality of service nodes 204 may abstract underlying distributed network. In an embodiment of the present disclosure, the plurality of service nodes 204 may be a large core running on distributed computes. Further, the plurality of service nodes 204 may add an additional instance dynamically to increase the network. In an exemplary embodiment of the present disclosure, the plurality of service nodes 204 include Access & Mobility Management Function (AMF), Session Management Function (SMF), User Plane Function (UPF), Network Slicing Selection Function (NSSF), Network Repository Functions (NRF), Point Coordination Function (PCF), Network Slicing Selection Function (NSSF), Unified Data Management (UDM), User Defined Routes (UDR), Authentication Server Function (AUSF), Non-3GPP Interworking Function (N3IWF), Mobility Management Entity (MME), Signaling Gateway (SGW), Packet Gateway (PGW), Policy and Charging Rules Function (PCRF), Home Subscriber Server (HSS), Sgi services and the like. In an embodiment of the present disclosure, the plurality of service nodes 204 obtain Radio Access Network (RAN) awareness via open Application programming Interface (API) and enable intelligent services across multi-Radio Access Technology (RAT), such as 4G, 5G, 6G, Wi-Fi and the like. In an embodiment of the present disclosure, the RAN information may be obtained from Self Organizing Network (SON), such as RAN Intelligent Controller (RIC) for making smart ML based decisions. In an embodiment of the present disclosure, the plurality of service nodes 204 provide distributed and disaggregated one or more microservices for multiple elements of packet core network. In an exemplary embodiment of the present disclosure, the one or more microservices include mobility management, session management, transport management, data management, subscriber management and the like. In establishing the secure real time communication session with the one or more electronic devices 108 and the plurality of service nodes 204 based on the received request and the determined one or more device parameters, the method 600 includes obtaining one or more mesh parameters, such as link capacity, delay, bandwidth and the like and one or more security parameters for authentication and encryption based on the received request and the determined one or more device parameters. Further, the method 600 includes establishing the secure real time communication session with the one or more electronic devices 108 and the plurality of service nodes 204 based on the obtained one or more mesh parameters and the obtained one or more security parameters.

In an embodiment of the present disclosure, the method 600 includes broadcasting one or more handshake messages to each of the plurality of service nodes 204 upon establishing the secure real time communication session. For example, the one or more handshake messages may be HELLO messages. In an embodiment of the present disclosure, the one or more handshake messages are broadcasted to each of the plurality of service nodes 204 via the plurality of cloud mesh links 206. In an exemplary embodiment of the present disclosure, the one or more handshake messages include information corresponding to CPU load, networking load, applications peered corresponding to each of the plurality of service nodes 204, environment information, control information, additional node properties and the like. In an embodiment of the present disclosure, each of the plurality of service nodes 204 periodically broadcasts the one or more handshake messages to indicate change in one or more environmental parameters in topology. In an exemplary embodiment of the present disclosure, the one or more environmental parameters include cost of electricity during various time intervals, temperature in data centers, cost of computing during various time intervals, traffic during various time intervals, Radio Access Networks (RANs) being served, tracking areas served, latencies and the like. Each of the plurality of service nodes 204 acknowledges the received broadcasted one or more handshake messages. In an embodiment of the present disclosure, the one or more handshake messages may flow outside the plurality of cloud mesh links 206 to convey similar information such as Central processing Unit (CPU) load, networking load and the like.

At step 604, one or more network parameters associated with the established secure real time communication session are determined based on the received request, the one or more device parameters, one or more computing system parameters and one or more responses received for the broadcasted one or more handshake messages from the plurality of service nodes 204 by using a trained traffic management based Machine Learning (ML) model. In an embodiment of the present disclosure, the plurality of service nodes 204 may include multiple physical parameters characterizing the plurality of service nodes 204 and compute one or more system parameters, such as energy requirement, power utilization, processing type, processing power and the like. Further, each of the plurality of service nodes 204 may have their own state information and characteristics, such as delay, jitter, packet flow information, protocol parameter information, quality of experience and the like, known as one or more network function parameters. In an embodiment of the present disclosure, one or more external inputs or parameters are received via internet 208. Furthermore, the one or more system parameters, the one or more network function parameters and the one or more external inputs or parameters are the one or more computing system parameters. In an exemplary embodiment of the present disclosure, the one or more network parameters include routing information, control information, tree topology, cost to reach each of the plurality of service nodes 204, resiliency requirement, applications peered to each of the plurality of service nodes 204, a set of services peered to each of the plurality of service nodes 204 and the like. The one or more responses received for the broadcasted one or more handshake messages include CPU load, networking load, applications peered corresponding to each of the plurality of service nodes 204 and the like. In an embodiment of the present disclosure, the determination of the one or more network parameters allows appropriate routing of application specific traffic to the plurality of service nodes 204.

At step 606, current network demand within the cloud infrastructure 200 is determined based on the received request by using the trained traffic management based ML model. In an embodiment of the present disclosure, the determined current network demand corresponds to one or more external parameters.

At step 608, one or more service nodes at multiple levels of hierarchy within the cloud infrastructure 200 are determined from the plurality of service nodes 204 based on the determined one or more network parameters and the determined current network demand by using the trained traffic management based ML model. In an embodiment of the present disclosure, the multiple levels of hierarchy include a first level of hierarchy, a second level of hierarchy and a third level of hierarchy and the like. The first level of hierarchy corresponds to a first proximal distance from the one or more electronic devices 108. Further, the second level of hierarchy corresponds to a second proximal distance from the one or more electronic devices. Further, the third level of hierarchy corresponds to a third proximal distance from the one or more electronic devices. In determining the one or more service nodes at multiple levels of hierarchy within the cloud infrastructure 200 from the plurality of service nodes 204 based on the determined one or more network parameters and the determined current network usage by using the trained traffic management based ML model, the method 600 includes determining one or more node parameters corresponding to the plurality of service nodes 204 based on the determined one or more network parameters, the determined current network and the received request by using the trained traffic management based ML model. In an exemplary embodiment of the present disclosure, the one or more node parameters include zone of each of the plurality of service nodes 204, availability of each of the plurality of services nodes 204, distance between the plurality of service nodes 204 and the one or more electronic devices 108, distance between the plurality of service nodes 204 and the one or more external devices 202 and the like. Further, the method 600 includes correlating the determined one or more node parameters with the determined one or more network parameters and the determined current network demand by using the trained traffic management based ML model. The method 600 includes determining the one or more service nodes at the multiple levels of hierarchy within the cloud infrastructure 200 from the plurality of service nodes 204 proximal to the one or more electronic devices 108 and the one or more external devices 202 based on result of correlation.

In an embodiment of the present disclosure, the method 600 includes determining best possible service node among the one or more service nodes at the multiple levels of hierarchy within the cloud infrastructure 200 capable of processing the received request based on the determined one or more network parameters, the determined current network demand and the determined one or more node parameters by using the trained traffic management based ML model. In an embodiment of the present disclosure, it may be ensured that there are no traffic loops or ping pongs of the traffic while processing the received request at the determined best possible node. The method 600 includes leveraging local or cloud computing seamlessly and pairs the one or more external devices 202 with nearest cloud egress by using the trained traffic management based ML model. In determining the best possible service node capable of processing the received request, the method 600 includes identifying node configuration of each of the plurality of service nodes 204 present in the established secure real time communication session based on the determined one or more responses received for the broadcasted one or more handshake messages from the plurality of service nodes 204. Further, the method 600 includes applying the identified node configuration, the determined one or more network parameters and the determined one or more node parameters to the trained traffic management based ML model. The method 600 includes selecting the best possible node based on the result of application. In an embodiment of the present disclosure, each of the plurality of service nodes 204 may determine traffic type associated with the one or more electronic devices 108 and best possible service node for the determined traffic type by using the trained traffic management based ML model for processing the request. When the best possible service node may not be peered to the one or more services directly, the best possible service node may use hop by hop routing to transmit the request to most appropriate service node for processing the request.

Further, the method 600 includes receiving the one or more mesh parameters, the one or more security parameters, the one or more environmental parameters and the control information from the plurality of service nodes 204 via the one or more orchestrator nodes 214. In an embodiment of the present disclosure, the one or more orchestrator nodes 214 are connected to the plurality of service nodes 204 via the set of cloud mesh links 216. In embodiment of the present disclosure, each of the one or more orchestrator nodes 214 is an instance of a collective group of network functions hosted on the one or more data centers. The one or more orchestrator nodes 214 may be hosted locally, across multiple systems or multi-cloud. Further, the method 600 includes transmitting the collected one or more mesh parameters, the collected one or more security parameters, the collected one or more environmental parameters and the collected control information to each of the plurality of service nodes 204 via the one or more orchestrator nodes 214. In an embodiment of the present disclosure, the one or more orchestrator nodes 214 act as a higher-level logic for receiving and transmitting the one or more mesh parameters, the one or more security parameters, the one or more environmental parameters and the control information to each of the plurality of service nodes 204. Further, the one or more orchestrators may include a set of orchestrator nodes to store a big picture view of the plurality of service nodes 204 or network of networks. The one or more orchestrator nodes 214 seed the plurality of cloud mesh links 206 and notifies the plurality of mesh links about location of each of the plurality of service nodes 204, such that the plurality of service nodes 204 may communicate with each other. Thus, the plurality of cloud mesh links 206 may be partitioned, such that the plurality of mesh links may not become too large based on the one or more environmental parameters. In an embodiment of the present disclosure, the one or more orchestrator nodes 214 push one or more sharing parameters when multiple parities including operators and enterprise share the same plurality of service nodes 204. The plurality of service nodes 204 along with the plurality of cloud mesh links 206 and the one or more orchestrator nodes 214 form autonomous network elements to facilitate autonomous communications between the one or more data centers. In an embodiment of the present disclosure, the one or more orchestrator nodes 214 facilitate automatic addition of a set of service nodes in the network for scaling the plurality of service nodes 204. The plurality of service nodes 204 determine whether traffic type and service type corresponding to each of the plurality of service nodes 204 are malicious by using the trained traffic management based ML model. In an embodiment of the present disclosure, transmission of the malicious traffic to the plurality of service nodes 204 is terminated upon determining that the determined traffic type and service type are malicious. In an exemplary embodiment of the present disclosure, the traffic type and the service type may be malicious due to one or more cybersecurity attacks, such as Distributed Denial of Service (DDOS), virus, botnet, rogue applications and the like. In an embodiment of the present disclosure, one or more orchestrator nodes 214 are notified about the malicious traffic type and the malicious service type, such that the one or more orchestrator nodes 214 may notify each of the plurality of service nodes 204 about the malicious traffic type and the malicious service type. The plurality of service nodes 204 detect one or more issues associated with each of the plurality of service nodes 204. In an exemplary embodiment of the present disclosure, the one or more issues include faults, failures and the one or more environmental parameters in the plurality of service nodes 204. The plurality of service nodes 204 distribute traffic to other service nodes without the one or more issues upon detecting the one or more issues associated with the plurality of service nodes 204. Furthermore, roaming instances of the plurality of service nodes 204 may be instantiated on roaming zones to minimize roaming related network costs. In an embodiment of the present disclosure, the roaming instances associated the plurality of service nodes 204 are connected with home instances associated with the plurality of service nodes 204 via multiple cloud mesh links. This connection of the roaming instances with the home instances allows home operator to locally terminate traffic and minimize roaming network costs.

At step 610, one or more cloud mesh links are dynamically established between the determined one or more service nodes 204 at the multiple levels of hierarchy and the one or more external devices 202 based on the determined one or more network parameters and the determined current network demand by using the trained traffic management based ML model. In an embodiment of the present disclosure, the one or more cloud mesh links are secured ad hoc routing connections, such as Open Shortest Path First (OSPF) and the like encrypted via the one or more encryption techniques. In an exemplary embodiment of the present disclosure, the one or more encryption techniques include IP Security (IPSEC), Blockchain and the like. In dynamically establishing the one or more cloud mesh links between the determined one or more service nodes 204 at the multiple levels of hierarchy and the one or more external devices 202 based on the determined one or more network parameters and the determined current network usage by using the trained traffic management based ML model, the method 600 includes determining an optimal communication path with the determined one or more service nodes 204 at the multiple levels of hierarchy to reach the one or more external devices 202 based on the determined one or more network parameters, the determined current network demand and the determined one or more node parameters by using the trained traffic management based ML model. Further, the method 600 includes sending a request to each of the determined one or more service nodes 204 at the multiple levels of hierarchy. The method 600 includes obtaining acknowledgement of the sent request from each of the determined one or more service nodes 204 at the multiple levels of hierarchy. Furthermore, the method 600 includes dynamically establishing the one or more cloud mesh links between the determined one or more service nodes 204 at the multiple levels of hierarchy based on the determined optimal communication path, the determined one or more network parameters, the determined current network demand and the determined one or more node parameters by using the trained traffic management based ML model upon obtaining the acknowledgment from each of the determined one or more service nodes 204 at the multiple levels of hierarchy.

At step 612, the received request is processed by providing access of the one or more services hosted on the one or more external devices 202 to the one or more electronic devices 108 via the established one or more cloud mesh links. In an exemplary embodiment of the present disclosure, processing the request include providing access of the one or more services hosted on the one or more external devices 202 to the one or more external devices 202 via the established one or more cloud mesh links, running the one or more services on the one or more electronic devices 108 within the communication network 210, securely streaming content of the one or more services onto the one or more electronic devices 108 with restrictive access, providing access of the one or more external devices 202 to the one or more electronic devices 108, facilitating communication between the one or more electronic devices 108 and the one or more external devices 202 and the like.

In an embodiment of the present disclosure, the method 600 includes slicing the one or more service nodes 204 at the multiple levels of hierarchy based on predefined sharing arrangements. Further, the method 600 includes allocating the sliced one or more service nodes 204 at the multiple levels of hierarchy to each of the one or more users for processing the received request based on the predefined sharing arrangements.

Further, the established secure real time communication session is terminated after the received request is processed.

The method 600 may be implemented in any suitable hardware, software, firmware, or combination thereof.

Thus, various embodiments of the present computing system 300 provide a solution to facilitate management of data and signaling traffic in the distributed and multi vendor data center and cloud infrastructure. In an embodiment of the present disclosure, the computing system 200 facilitates autonomous management of data and control traffic in a heterogenous and distributed cloud infrastructure. The computing system 300 provides a distributed, local, and multi-cloud core software system with machine learning-based intelligence and edge computing for use in mobile operator and enterprise applications. In an embodiment of the present disclosure, the computing system 300 is capable of leveraging AI based distribution across all resources, such as local and cloud providers. Thus, the computing system 300 resolves the constraints of a given fixed resource and seamlessly leverage any available resource by using predictive behavior and learning via different parameters defined in the computing system. In an embodiment of the present disclosure, the computing system 300 facilitates autonomous management of data and control traffic in a distributed and multi-vendor data-center and cloud infrastructure. Further, the computing system 300 also pairs the one or more external devices 202 with nearest cloud egress by using the machine learning based intelligence and provide core networks to operator and enterprises. The computing system 300 creates autonomous network operations and intelligently works despite of any impairments. Thus, the computing system 300 is resilient. Since the computing system 300 determines the one or more service nodes for processing the received request, the computing system 300 decreases latency and improves overall speed of accessing the one or more one or more services. In an embodiment of the present disclosure, the computing system establishes the one or more cloud mesh links between the one or more service nodes at multiple level of hierarchy for network resiliency, energy saving and optimized routing and the like to one or more external devices based on the one or more network parameters, the one or more system parameters, the one or more environment parameters, current network demand and the like. The computing system 300 provides a scalable cost-effective solution to the problem of the growth of cloud-based services and user consumption by dynamically establishing the one or more cloud mesh links between the one or more service nodes and the one or more external devices 202 for processing the received request. In an embodiment of the present disclosure, the computing system 300 may be used in various mobile technology network functions such as 4G, 5G, 6G, WiFi and the like. The computing system 300 may also be used in creation of one or more services and one or more products, such as networking equipment including wired and wireless networking equipment, routers, switches, radio network functions, voice network functions, wireline and wireless converged gateways such as Broadband Network Gateway (BNG), multimedia equipment/components/functions, IP fabric and the like. Furthermore, the computing system 300 uses the fisheye technique to keep best information for the nearby service nodes and directionality information for the farther service nodes. The computing system 300 leverages local server, cloud servers or a combination thereof to provide seamless service. Further, the computing system 300 core is disaggregating 3GPP packet core network from a centralized and large monolith core network to a distributed and disaggregated network to enable peer to peer application communication, hybrid cloud and autonomous 4G, 5G, 6G, WiFi networks. The computing system 300 achieves the distributed and disaggregated network by creating a cluster of 4G/5G/6G/WiFi core network functions in different locations and creating the plurality of cloud mesh links 206 between them. The plurality of cloud mesh links 206 allow peer to peer application and services enablement, new roaming models and new resiliency models. Furthermore, the plurality of service nodes 204 are autonomous and keep relatively small footprint for fault containment. Thus, the computing system 300 allows the one or more users to have best user experience and resilience. Also, the computing system 300 save operators cost by using multiple hosting options. Further, the computing system 300 provides distributed and disaggregated network to achieve fault containment while providing all benefits of a large-centralized core. The distributed and disaggregated network provided by the computing system 300 is simple and easy to maintain.

Seamless Private Network

In an embodiment of the present disclosure, the plurality of cloud mesh links 206 are established between the service node 204-3 used for enterprise network 220 and other service nodes 204-1, 204-2, 204-4. In one embodiment of the present disclosure, the set of network functions on service node 204-3 using the cloud mesh link and ML algorithm, makes an optimized routing decision to send the data and signalling traffic to the service node 204-1, the service node 204-2 or the service node 204-4. In one embodiment of the present disclosure, the service node 204-3 using the cloud mesh link to service nodes 204-1, 204-2 and 204-4 enables private network to public network roaming and send the data and signalling traffic from a roaming device in the enterprise network 220 to the home network of the roamer. Further, service node 204-3 using the plurality of cloud mesh links 206 may enable dynamic roaming agreement with the public networks 212-1, 212-2 and 212-3. This allows managing the roaming control, data and provisioning traffic to public networks 212-1, 212-2 and 212-3. This simplifies and eliminates the traditional clearing house requirements in the roaming scenarios. Furthermore, this makes the communication network 210 created by adjoining the plurality of service nodes 204 via the plurality of cloud mesh links 206, the communication network 210 where multiple enterprise networks can communicate with multiple mobile operator networks. In an embodiment of the present disclosure, the communication network 210 may be a neutral communication network. The neutral communication network may be provided as a Software as a Service (SaaS) offering. In one embodiment, the set of network functions on the service node 204-3 may use the information shared on the plurality of cloud mesh links 206 or information shared by edge manager in a decentralized architecture to create a network slice for devices roaming in the enterprise networks. Further, this shall be called reverse network slicing where devices from public networks 212-1, 212-2 and 212-3 are visiting the enterprise network 220 and require service from their home networks, may get the service using the service node's 204-3 shared resources to access the home network functions and resources. In one embodiment of the present disclosure, the one or more electronic devices 108 from the public networks 212-1, 212-2 and 212-3 may get seamless service experience via this reverse slice while roaming in a plurality of enterprise networks. Furthermore, a dual Subscriber Identity Module (SIM) or Mobile Virtual Network Operator (MVNO) SIM allows seamless experience to the one or more electronic devices 108 in the enterprise network 220, in these cases when an enterprise device is homed in the enterprise it provides local services. However when the enterprise device moves outside the enterprise, the data traffic can optionally come back to the enterprise service node 204-3 using secured Cloud Mesh links. Hence providing a seamless service experience. This allows enterprises to control the traffic from the mobile as well as enterprise applications to be peered and available to the one or more users. In one embodiment of the present disclosure, the communication network 210 allows stored data security by keeping the stored in the enterprise network 220. Further, plurality of service nodes 204 may serve same enterprise network 220 to provide resiliency. In one embodiment of the present disclosure, the plurality of service nodes 204 may serve same enterprise network 220 to provide better content data network location and efficient application peering. In one embodiment of the present disclosure, the plurality of enterprise networks can form the plurality of cloud mesh links with each other using the plurality of service nodes 204. In one embodiment the plurality of enterprise networks 220 forming cloud mesh links with each other using the plurality of service node 204-3 may have an enterprise roaming agreement with each other facilitated by secure cloud mesh links. Further, the plurality of enterprise networks 220 forming the plurality of cloud mesh links with each other using the plurality of service nodes 204-3 may not need an enterprise roaming agreement with each other if they are owned by the same vendor and provide the enterprise-to-enterprise communication over secure cloud mesh links without a roaming agreement.

Figure 7:
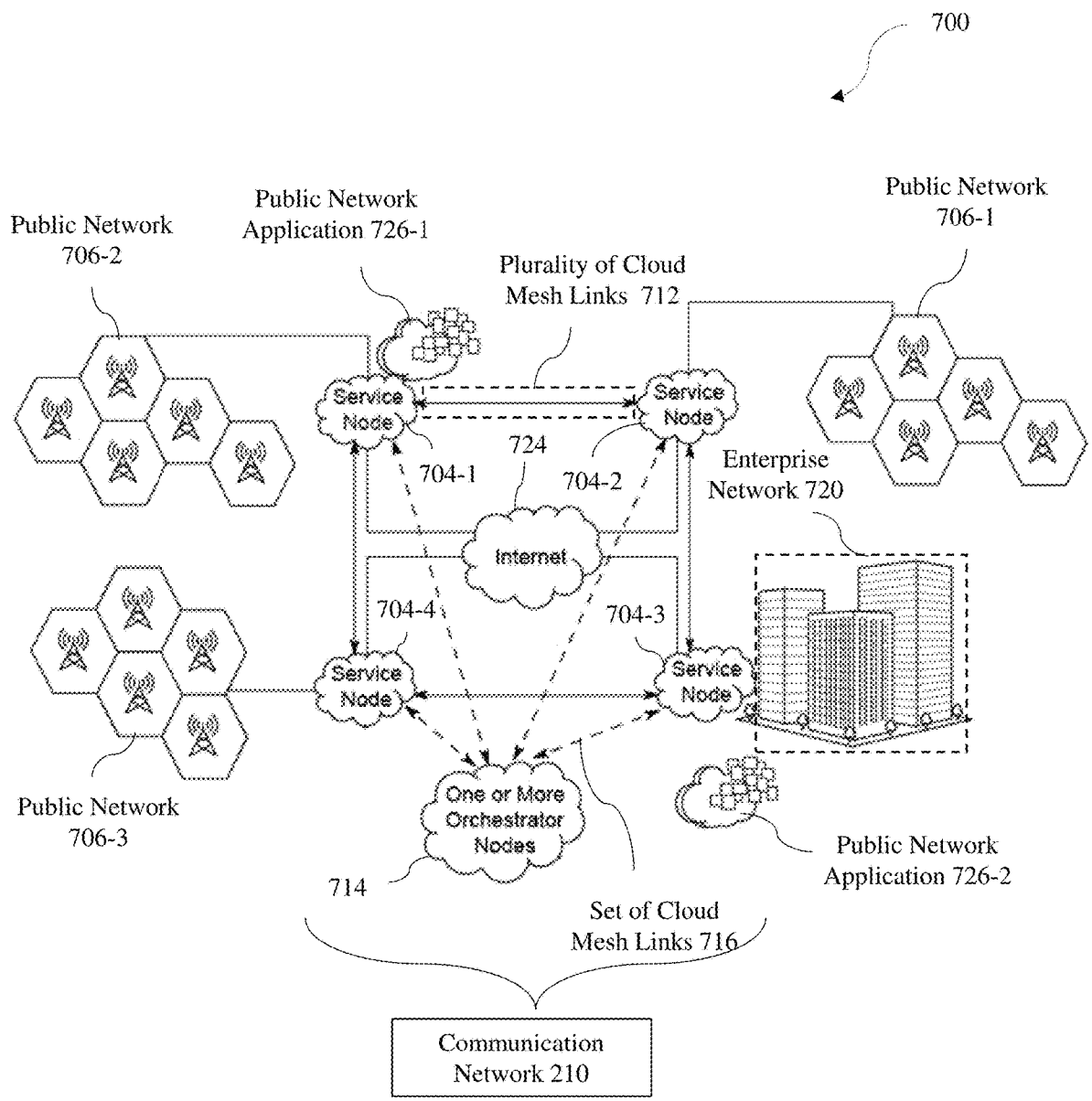
FIG. 7 is a schematic representation of an exemplary computing environment for facilitating autonomous communications from the enterprise to public networks, in accordance with another embodiment of the present disclosure.

FIG. 7 is a schematic representation of an exemplary computing environment for facilitating autonomous interconnectivity between private and public network, in accordance with an embodiment of the present disclosure. In an exemplary embodiment of the present disclosure, the computing environment 700 is applicable in telecommunication, healthcare, manufacturing, transport, public safety domains and the like. The computing environment 700 includes the plurality of service nodes 704-1, 704-2, 704-3 and 704-4. For the sake of present description, the plurality of service nodes 704-1, 704-2, 704-3 and 704-4 have been represented as the plurality of service nodes 704. The service node 704-3 is an enterprise cloud associated with the organization. Further, the service node 704-4 is a far edge cloud located at a distant position from the organization. The computing environment 700 includes one or more electronic devices 108 associated with the organization connected to the enterprise network 720 via the private communication channel. In an exemplary embodiment of the present disclosure, the enterprise network is a 4G or 5G or 6G or WiFi network and the like. Furthermore, the computing environment includes a first public network 706-1, a second public network 706-2 and a third public network 706-3 to communicatively couple the one or more external devices 202 to the plurality of service nodes 704. In an embodiment of the present disclosure, the first public network 706-1, the second public network 706-2 and the third public network 706-3 is similar to the public networks 212-1, 212-2, 212-3 as shown in FIG. 2B. In an embodiment of the present disclosure, the second public network 706-2 is shorter public network. The plurality of service nodes 704 are connected with each other via the network 712 and internet 724. In an embodiment of the present disclosure, the internet 724 and the internet 208 depicted in FIG. 2B are similar. Further, the one or more orchestrator nodes 714 are connected to the plurality of service nodes 704 via the network 712. In an exemplary embodiment of the present disclosure, the network 712 may be the one or more cloud mesh links. The one or more external devices 702 host a first public network application 726-1 and a second public network application 726-2 accessible by the plurality of service nodes 704.

Further, the computing system 300 is configured to receive a request from the one or more electronic devices 108 within the enterprise network 720 to access the one or more public network applications. In an exemplary embodiment of the present disclosure, the one or more public network applications comprise: YouTube, Netflix, Facebook and the like. In an exemplary embodiment of the present disclosure, the one or more electronic devices 108 may include a laptop computer, desktop computer, tablet computer, smartphone, wearable device, smart watch and the like. The plurality of service nodes 704 are connected with each other via the plurality of cloud mesh links. In an embodiment of the present disclosure, the plurality of cloud mesh links are secured ad hoc links between the plurality of service nodes 704. The plurality of cloud mesh links forms an ad-hoc network using connectivity of underlying networking architecture. In an embodiment of the present disclosure, the plurality of cloud mesh links periodically re-new one or more security association parameters, such that the plurality of cloud mesh links may exit association with the plurality of service nodes 704 upon failure in renewing of the one or more security association parameters. The plurality of cloud mesh links are encrypted via one or more encryption techniques. In an exemplary embodiment of the present disclosure, the one or more encryption techniques include IP Security (IPSEC), Blockchain and the like. Further, the request includes Uniform Resource Locator (URL) of the one or more public network applications. In an embodiment of the present disclosure, the one or more public network applications are hosted on the one or more external devices 202. In an exemplary embodiment of the present disclosure, the one or more external devices 202 may be proxy servers or base stations.

In an embodiment of the present disclosure, the computing system 300 is configured to determine the one or more device parameters associated with the one or more electronic devices 108 based on the received request. In an exemplary embodiment of the present disclosure, the one or more device parameters include type of network associated with the one or more electronic devices 108, type of the one or more electronic devices 108, location of the one or more electronic devices 108 and the like. In an exemplary embodiment of the present disclosure, the type of network associated with the one or more electronic devices 108 include public network and private network. Further, the type of the one or more electronic devices 108 include secured device, unsecured device and the like.

Furthermore, the computing system 300 is configured to establish the secure real time communication session with the one or more electronic devices 108 and the plurality of service nodes 704 based on the received request and the determined one or more user parameters. In an embodiment of the present disclosure, the plurality of service nodes 704 may work in a pooled mode. In the pooled mode, the plurality of service nodes 704 work as a single system. In establishing the secure real time communication session with the one or more electronic devices 108 and the plurality of service nodes 704 based on the received request and the determined one or more user parameters, the computing system 300 obtains one or more mesh parameters and one or more security parameters based on the received request and the determined one or more device parameters. Further, the computing system 300 establishes the secure real time communication session with the one or more electronic devices 108 and the plurality of service nodes 704 based on the obtained one or more mesh parameters and the obtained one or more security parameters.

In an embodiment of the present disclosure, the computing system 300 is configured to broadcast one or more handshake messages to each of the plurality of service nodes 704 upon establishing the secure real time communication session. For example, the one or more handshake messages may be HELLO messages. In an embodiment of the present disclosure, the one or more handshake messages are broadcasted to each of the plurality of service nodes 704 via the plurality of cloud mesh links. In an exemplary embodiment of the present disclosure, the one or more handshake messages include information corresponding to CPU load, networking load, applications peered corresponding to each of the plurality of service nodes 704, environment information, control information and the like. In an embodiment of the present disclosure, each of the plurality of service nodes 704 periodically broadcasts the one or more handshake messages to indicate change in one or more environmental parameters in topology. In an exemplary embodiment of the present disclosure, the one or more environmental parameters include cost of electricity during various time intervals, temperature in data centers, cost of computing during various time intervals, traffic during various time intervals, Radio Access Networks (RANs) being served, tracking areas served, latencies and the like. Each of the plurality of service nodes 704 acknowledges the received broadcasted one or more handshake messages.

Further, the computing system 300 is configured to determine the one or more network parameters associated with the established secure real time communication session based on one or more responses received for the broadcasted one or more handshake messages from the plurality of service nodes 704, the received request and the one or more device parameters by using a trained network based Machine Learning (ML) model such as deep neural network. In an exemplary embodiment of the present disclosure, the one or more network parameters include routing information, control information, tree topology, cost to reach each of the plurality of service nodes 704, applications peered to each of the plurality of service nodes 704 and the like. The one or more responses received for the broadcasted one or more handshake messages include CPU load, networking load, applications peered corresponding to each of the plurality of service nodes 704 and the like. In an embodiment of the present disclosure, the determination of the one or more network parameters allows appropriate routing of application specific traffic to the plurality of service nodes 704.

Furthermore, computing system 300 is configured to perform one or more network checks on the established secure real time communication session based on the determined one or more network parameters. The one or more network checks include determining whether traffic type and application type associated with the plurality of service nodes 704 are malicious by using the trained network based ML model. In an embodiment of the present disclosure, transmission of the malicious traffic to the plurality of service nodes 704 is terminated upon determining that the determined traffic type and application type are malicious. In an exemplary embodiment of the present disclosure, the traffic type and the application type may be malicious due to one or more cybersecurity attacks, such as Distributed Denial of Service (DDOS), virus, botnet, rogue applications and the like. The computing system 300 may also notify the one or more orchestrator nodes 714 about the malicious traffic type and the malicious application type, such that the one or more orchestrator nodes 714 may notify each of the plurality of service nodes 704 about the malicious traffic type and the malicious application type. Further, the one or more network checks include detecting one or more issues associated with the plurality of service nodes 704. In an exemplary embodiment of the present disclosure, the one or more issues include faults and failures in the plurality of service nodes 704. The plurality of service nodes 704 distribute traffic to other service nodes upon detecting the one or more issues associated with the plurality of service nodes 704. The one or more network checks also include determining the one or more environmental parameters of the plurality of service nodes 704. Furthermore, the one or more network checks include applying fisheye technique on the plurality of service nodes 704 to update the one or more responses received for the broadcasted one or more handshake messages from the plurality of service nodes 704. In an embodiment of the present disclosure, the fisheye technique is used to frequently update data in nearby service nodes and infrequently update data in farther nodes. The nearby nodes are smaller hops away and the farther nodes are larger hops away. The one or more network checks also include establishing a secure communication network between the plurality of service nodes 704 associated with the organization and one or more service nodes associated with other organizations via a set of cloud mesh links. In an embodiment of the present disclosure, the organization has roaming relationships with the other organizations. When the organization has roaming relationships with the other organizations, the organization may form the set of cloud mesh links with the other organization with restricted information flow in the set of cloud mesh links. When the organization does not have roaming relationships with the other organizations, the secure communication network is not established between the plurality of service nodes 704 associated with the organization and the one or more service nodes associated with other organizations. In an embodiment of the present disclosure, the organization may not form the set of cloud mesh links with the other organizations due to security keys. The establishment of the secure communication network allows seamless integration with the public network 706 while keeping data associated with the organization within the enterprise network 720. In an exemplary embodiment of the present disclosure, the data associated with the organization include control data, environment data and the like. In an embodiment of the present disclosure, the data associated with the organization is not shared with the one or more service nodes. However, the plurality of service nodes 704 may receive data associated with the other organizations. The one or more network checks include transmitting traffic associated with the other organizations to the one or more service nodes associated with the other organizations via the set of cloud mesh links if the organization has roaming relationships with the other organizations. In an embodiment of the present disclosure, the traffic associated with the other organizations is transmitted to service nodes associated with operator via the set of cloud mesh links if the organization does not have roaming relationships with the other organizations.

In an embodiment of the present disclosure, the computing system 300 is configured to determine best possible service node capable of processing the received request based on the results of the one or more network checks by using the trained network based ML model. In an embodiment of the present disclosure, the computing system 300 leverages local or cloud computing seamlessly and pairs the one or more public network applications with nearest cloud egress by using the trained network based ML model. In determining the best possible service node capable of processing the received request based on the results of the one or more network checks by using the trained network based ML model, the computing system 300 identifies node configuration of each of the plurality of service nodes 704 present in the established secure real time communication session based on the determined one or more responses received for the broadcasted one or more handshake messages from the plurality of service nodes 704. Further, the computing system 300 applies the identified node configuration and the determined one or more network parameters to the trained network based ML model. The computing system 300 selects the best possible node based on the result of application.

Further, the one or more orchestrator nodes 714 are connected to the plurality of service nodes 704 via the one or more cloud mesh links. In an embodiment of the present disclosure, each of the one or more orchestrator nodes 714 is an instance of a collective group of network functions hosted on the one or more resources. The one or more orchestrator nodes 714 receive one or more mesh parameters, one or more security parameters, one or more environmental parameters and the control information from the plurality of service nodes 704. Further, the one or more orchestrator nodes 714 transmit the collected one or more mesh parameters, the collected one or more security parameters, the collected one or more environmental parameters and the collected control information to each of the plurality of service nodes 704. In an embodiment of the present disclosure, the one or more orchestrator nodes 714 act as a higher-level logic for receiving and transmitting the one or more mesh parameters, the one or more security parameters, the one or more environmental parameters and the control information to each of the plurality of service nodes 704. Further, the one or more orchestrators 714 may include a set of orchestrator nodes to store a big picture view of the plurality of service nodes 704 or network of networks. The one or more orchestrator nodes 714 seed the plurality of cloud mesh links and notifies the plurality of mesh links about location of each of the plurality of service nodes 704, such that the plurality of service nodes 704 may communicate with each other. Thus, the plurality of cloud mesh links may be partitioned, such that the plurality of mesh links may not become too large based on the one or more environmental parameters. The plurality of service nodes 704 along with the plurality of cloud mesh links and the one or more orchestrator nodes 714 form autonomous network elements to facilitate autonomous communications between the one or more resources. In an embodiment of the present disclosure, the one or more orchestrator nodes 714 facilitate automatic addition of a set of service nodes in the network 712 for scaling the plurality of service nodes 704. Furthermore, the one or more orchestrator nodes 714 performs slice management of the plurality of service nodes 704 for the network 712. In an embodiment of the present disclosure, the plurality of service nodes 704 may slice the one or more resources in accordance with one or more sharing parameters such as quality of service, delay, SLA and the like, provided by the one or more orchestrator nodes 714. The one or more orchestrator nodes 714 may also dynamically manage slicing of the one or more resources required for the network 712. In an embodiment of the present disclosure, the one or more orchestrator nodes 714 configure roaming relationships between the organization and the other organizations.

Further, the computing system 300 is configured to process the received request at the determined best possible service node. In an exemplary embodiment of the present disclosure, processing the request include providing access of the one or more public network applications, running the one or more public network applications on the one or more electronic devices 108 within the enterprise network 720, securely hosting the one or more public network applications and securely streaming content of the one or more public network applications onto the one or more electronic devices 108 having restrictive access. In an embodiment of the present disclosure, the computing system 300 may ensure that there are no traffic loops or ping pongs of the traffic while processing the received request at the determined best possible node. In processing the received request at the determined best possible service node, the computing system 300 determines a communication path from a source node to the best possible node. Further, the computing system 300 transmits the request from the source node to the best possible node via the determined communication path. The computing system 300 processes the received request at the determined best possible service node.

Furthermore, the computing system 300 is configured to perform one or more network activities within the established secure real time communication session based on state of processing the request. In an exemplary embodiment of the present disclosure, the one or more network activities include checking plurality of cloud mesh links, performing validation checks of the streaming content and the like.

Further, in transmitting the request from the source node to the best possible node via the determined communication path, the computing system 300 determines if there exist one or more intermediate service nodes in the determined communication path. The computing system 300 transmits the request from the source node to the best possible service node via the determined one or more intermediate service nodes in the communication path. In an embodiment of the present disclosure, the computing system 300 uses hop by hop routing to transmit the request from the source node to the best possible service node via the determined one or more intermediate service nodes in the communication path.

In an embodiment of the present disclosure, a dual Subscriber Identification Module (SIM) or Mobile Virtual Network Operator (MVNO) SIM allows seamless experience to the plurality of users. When the one or more electronic devices 108 associated with the plurality of users are local to the organization, the plurality of users access the plurality of service nodes 704 via the enterprise network 720. However, when the one or more electronic devices 108 move outside the enterprise network 720 associated with the organization, data associated with the one or more electronic devices 108 may be transmitted to the plurality of service nodes 704 associated with the organization via the plurality of cloud mesh links. Thus, the computing system 300 provides seamless experience to the plurality of users associated with the organization by anchoring data associated with the one or more electronic devices 718 to the plurality of service nodes 704 associated with the organization. Further, when a public user moves into the enterprise network 720, the enterprise network 720 identifies the public user and re-anchors traffic associated with the public user to service nodes corresponding to the public network 706.

In an embodiment of the present disclosure, the computing system 300 is configured to terminate the established secure real time communication session after the received request is processed.

Figure 8A:
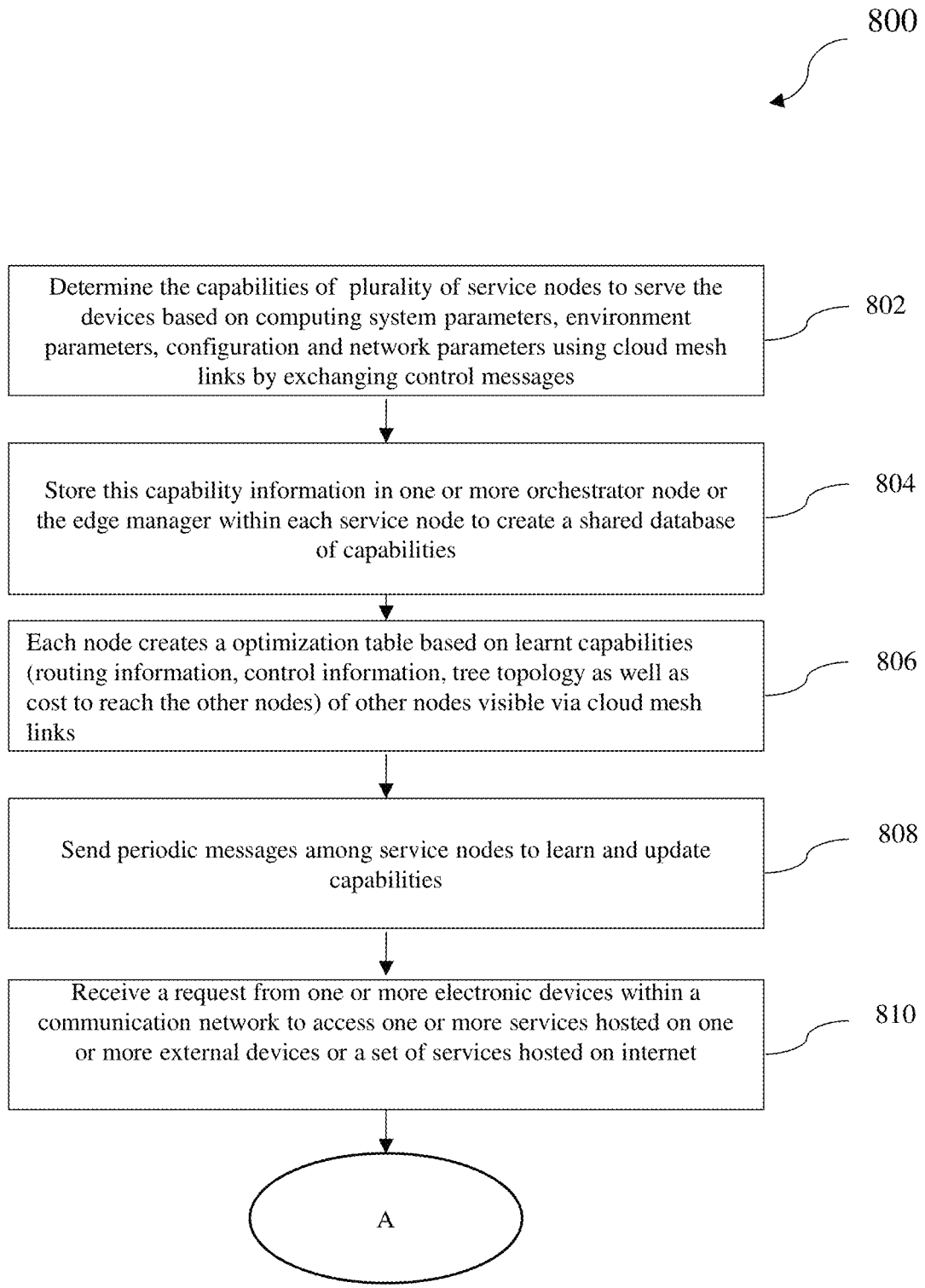
FIG. 8A is a process flow diagram illustrating an exemplary method for autonomous data and signalling traffic management in the distributed infrastructure for enterprise network, in accordance with an embodiment of the present disclosure.
Figure 8B:
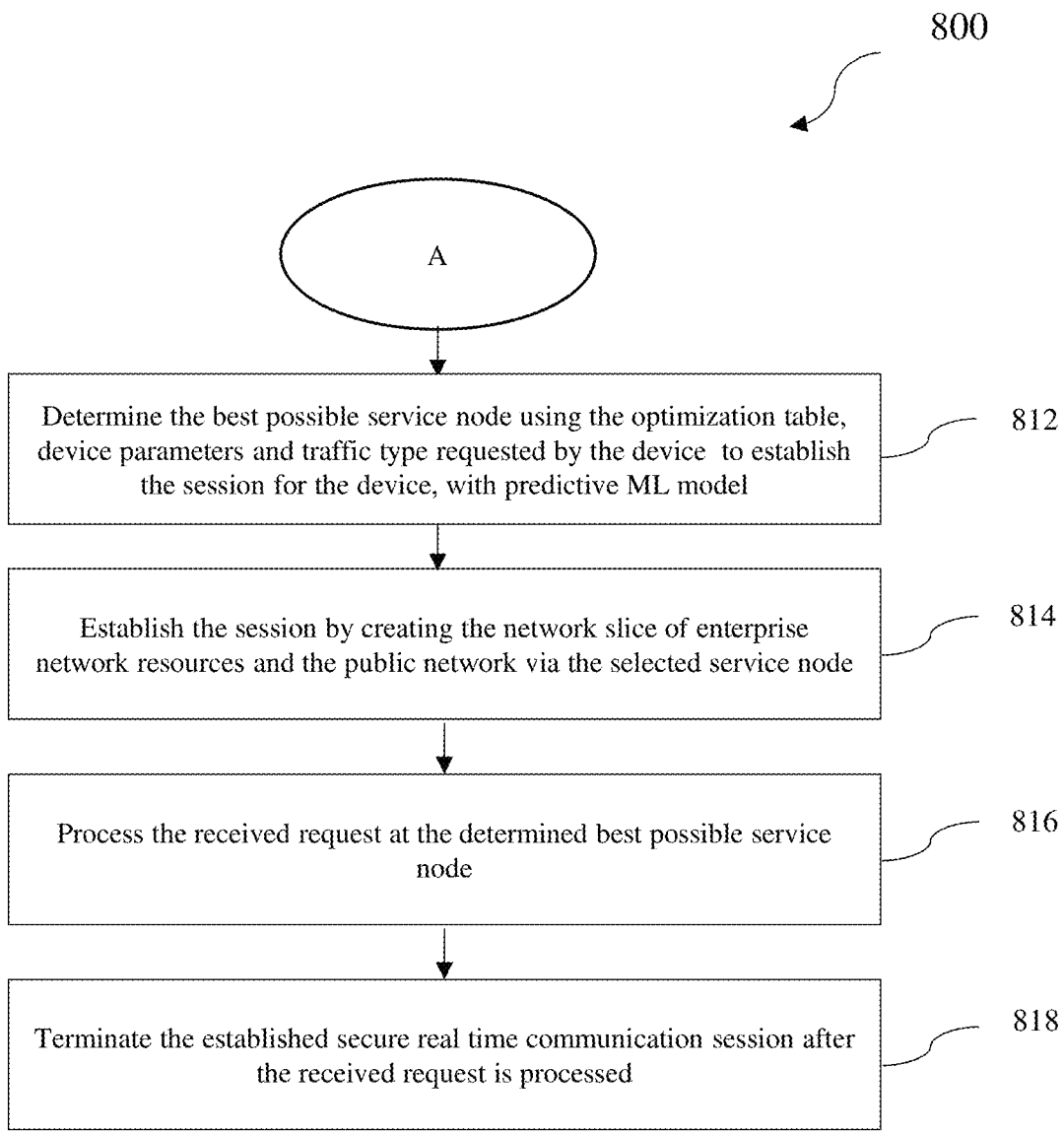
FIG. 8B is a process flow diagram illustrating an exemplary method for autonomous data and signalling traffic management in the distributed infrastructure for enterprise network, in accordance with an embodiment of the present disclosure.

In operation, the computing system 300 receives the request from the one or more electronic devices 108 within the enterprise network 720 to access the one or more public network applications. Further, the computing system 300 determines the one or more device parameters associated with the one or more electronic devices 108 based on the received request. The computing system 300 establishes the secure real time communication session with the one or more electronic devices 108 and the plurality of service nodes 704 based on the received request and the determined one or more user parameters. The computing system 300 also broadcasts the one or more handshake messages to each of the plurality of service nodes 704 upon establishing the secure real time communication session. Furthermore, the computing system 300 determines the one or more network parameters associated with the established secure real time communication session based on one or more responses received for the broadcasted one or more handshake messages from the plurality of service nodes 704, the received request and the one or more device parameters by using the trained network based ML model. The computing system 300 performs the one or more network checks on the established secure real time communication session based on the determined one or more network parameters. The computing system 300 further determines the best possible service node capable of processing the received request based on the results of the one or more network checks by using the trained network based ML model. Further, the computing system 300 processes the received request at the determined best possible service node. The computing system 300 also terminates the established secure real time communication session after the received request is processed. FIG. 8A is a process flow diagram illustrating an exemplary method for autonomous data and signalling traffic management in the distributed infrastructure for enterprise network, in accordance with an embodiment of the present disclosure. FIG. 8B is a process flow diagram illustrating an exemplary method for autonomous data and signalling traffic management in the distributed infrastructure for enterprise network, in accordance with an embodiment of the present disclosure.

At step 802, capabilities of a plurality of service nodes are determined to serve the devices based on computing system parameters, environment parameters, configuration and network parameters using cloud mesh links by exchanging control messages. Further, at step 804, this capability information is stored in one or more orchestrator nodes or the edge manager within each service node to create a shared database of capabilities. At step 806, each node creates a optimization table based on learnt capabilities (as routing information, control information, tree topology as well as cost to reach the other nodes) of other nodes visible via cloud mesh links. Furthermore, at step 808, periodic messages among service nodes are sent to learn and update capabilities. At step 810, a request is received from one or more electronic devices within a communication network to access one or more services hosted on one or more external devices or a set of services hosted on internet.

At step 812, the best possible service node is determined using the optimization table, device parameters and traffic type requested by the device to establish the session for the device, with predictive ML model. Further, at step 814, the session is established by creating the network slice of enterprise network resources and the public network via the selected service node. At step 816, the received request is processed at the determined best possible service node. Furthermore, at step 818, the established secure real time communication session is terminated after the received request is processed.

Seamless Private Network

The method 600 includes receiving a request from one or more electronic devices 108 within the enterprise network 720 to access one or more public network applications. In an exemplary embodiment of the present disclosure, the one or more public network applications comprise: YouTube, Netflix, Facebook and the like. In an exemplary embodiment of the present disclosure, the one or more electronic devices 108 may include a laptop computer, desktop computer, tablet computer, smartphone, wearable device, smart watch and the like. In an embodiment of the present disclosure, the method 600 is performed by a service node of a plurality of service nodes 704. In an embodiment of the present disclosure, the service node is an instance of collective group of network functions hosted on one or more resources. The plurality of service nodes 704 are connected with each other via a plurality of cloud mesh links. In an embodiment of the present disclosure, the plurality of cloud mesh links are secured ad hoc links between the plurality of service nodes 704. The plurality of cloud mesh links forms an ad-hoc network using connectivity of underlying networking architecture. In an embodiment of the present disclosure, the plurality of cloud mesh links periodically re-new one or more security association parameters, such that the plurality of cloud mesh links may exit association with the plurality of service nodes 704 upon failure in renewing of the one or more security association parameters. The plurality of cloud mesh links are encrypted via one or more encryption techniques. In an exemplary embodiment of the present disclosure, the one or more encryption techniques include IP Security (IPSEC), Blockchain and the like. The one or more resources include one or more local servers, tone or more cloud servers or a combination thereof. Further, the request includes Uniform Resource Locator (URL) of the one or more public network applications. In an embodiment of the present disclosure, the one or more public network applications are hosted on one or more external devices 202. In an exemplary embodiment of the present disclosure, the one or more external devices 202 may be proxy servers or base stations.

Further, the method 600 includes determining one or more device parameters associated with the one or more electronic devices 108 based on the received request. In an exemplary embodiment of the present disclosure, the one or more device parameters include type of network associated with the one or more electronic devices 108, type of the one or more electronic devices 108, location of the one or more electronic devices 108 and the like. In an exemplary embodiment of the present disclosure, the type of network associated with the one or more electronic devices 108 include public network and private network. Further, the type of the one or more electronic devices 108 include secured device, unsecured device and the like.

Furthermore, the method 600 includes establishing a secure real time communication session with the one or more electronic devices 108 and the plurality of service nodes 704 based on the received request and the determined one or more user parameters. In an embodiment of the present disclosure, the plurality of service nodes 704 may work in a pooled mode. In the pooled mode, the plurality of service nodes 704 work as a single system. In establishing the secure real time communication session with the one or more electronic devices 108 and the plurality of service nodes 704 based on the received request and the determined one or more user parameters, the method 600 includes obtaining one or more mesh parameters and one or more security parameters based on the received request and the determined one or more device parameters. Further, the method 600 includes establishing the secure real time communication session with the one or more electronic devices 108 and the plurality of service nodes 704 based on the obtained one or more mesh parameters and the obtained one or more security parameters.

In an embodiment of the present disclosure, one or more handshake messages are broadcasted to each of the plurality of service nodes 704 upon establishing the secure real time communication session. For example, the one or more handshake messages may be HELLO messages. In an embodiment of the present disclosure, the one or more handshake messages are broadcasted to each of the plurality of service nodes 704 via the plurality of cloud mesh links. In an exemplary embodiment of the present disclosure, the one or more handshake messages include information corresponding to CPU load, networking load, applications peered corresponding to each of the plurality of service nodes 704, environment information, control information and the like. In an embodiment of the present disclosure, each of the plurality of service nodes 704 periodically broadcasts the one or more handshake messages to indicate change in one or more environmental parameters in topology. In an exemplary embodiment of the present disclosure, the one or more environmental parameters include cost of electricity during various time intervals, temperature in data centers, cost of computing during various time intervals, traffic during various time intervals, Radio Access Networks (RANs) being served, tracking areas served, latencies and the like. Each of the plurality of service nodes 704 acknowledges the received broadcasted one or more handshake messages.

Further, the method 600 includes determining one or more network parameters associated with the established secure real time communication session based on one or more responses received for the broadcasted one or more handshake messages from the plurality of service nodes 704, the received request and the one or more device parameters by using a trained network based Machine Learning (ML) model. In an exemplary embodiment of the present disclosure, the one or more network parameters include routing information, control information, tree topology, cost to reach each of the plurality of service nodes 704, applications peered to each of the plurality of service nodes 704 and the like. The one or more responses of the broadcasted one or more handshake messages include CPU load, networking load, applications peered corresponding to each of the plurality of service nodes 704 and the like. In an embodiment of the present disclosure, the determination of the one or more network parameters allows appropriate routing of application specific traffic to the plurality of service nodes 704.

Furthermore, one or more network checks are performed on the established secure real time communication session based on the determined one or more network parameters. The one or more network checks include determining whether traffic type and application type associated with the plurality of service nodes 704 are malicious by using the trained network based ML model. In an embodiment of the present disclosure, transmission of the malicious traffic to the plurality of service nodes 704 is terminated upon determining that the determined traffic type and application type are malicious. In an exemplary embodiment of the present disclosure, the traffic type and the application type may be malicious due to one or more cybersecurity attacks, such as Distributed Denial of Service (DDOS), virus, botnet, rogue applications and the like. In an embodiment of the present disclosure, one or more orchestrator nodes 714 are notified about the malicious traffic type and the malicious application type, such that the one or more orchestrator nodes 714 may notify each of the plurality of service nodes 704 about the malicious traffic type and the malicious application type. Further, the one or more network checks include detecting one or more issues associated with the plurality of service nodes 704. In an exemplary embodiment of the present disclosure, the one or more issues include faults and failures in the plurality of service nodes 704. The plurality of service nodes 704 distribute traffic to other service nodes upon detecting the one or more issues associated with the plurality of service nodes 704. The one or more network checks also include determining the one or more environmental parameters of the plurality of service nodes 704. Furthermore, the one or more network checks include applying fisheye technique on the plurality of service nodes 704 to update the one or more responses received for the broadcasted one or more handshake messages from the plurality of service nodes 704. In an embodiment of the present disclosure, the fisheye technique is used to frequently update data in nearby service nodes and infrequently update data in farther nodes. The nearby nodes are smaller hops away and the farther nodes are larger hops away. The one or more network checks also include establishing a secure communication network between the plurality of service nodes 704 associated with the organization and one or more service nodes associated with other organizations via a set of cloud mesh links. In an embodiment of the present disclosure, the organization has roaming relationships with the other organizations. When the organization has roaming relationships with the other organizations, the organization may form the set of cloud mesh links with the other organization with restricted information flow in the set of cloud mesh links. When the organization does not have roaming relationships with the other organizations, the secure communication network is not established between the plurality of service nodes 704 associated with the organization and the one or more service nodes associated with other organizations. In an embodiment of the present disclosure, the organization may not form the set of cloud mesh links with the other organizations due to security keys. The establishment of the secure communication network allows seamless integration with the public network 706 while keeping data associated with the organization within the enterprise network 720. In an exemplary embodiment of the present disclosure, the data associated with the organization include control data, environment data and the like. In an embodiment of the present disclosure, the data associated with the organization is not shared with the one or more service nodes. However, the plurality of service nodes 704 may receive data associated with the other organizations. The one or more network checks include transmitting traffic associated with the other organizations to the one or more service nodes associated with the other organizations via the set of cloud mesh links if the organization has roaming relationships with the other organizations. In an embodiment of the present disclosure, the traffic associated with the other organizations is transmitted to service nodes associated with operator via the set of cloud mesh links if the organization does not have roaming relationships with the other organizations.

In an embodiment of the present disclosure, the method 600 includes determining best possible service node capable of processing the received request based on the results of the one or more network checks by using the trained network based ML model. In an embodiment of the present disclosure, the method 600 includes leveraging local or cloud computing seamlessly and pairs the one or more public network applications with nearest cloud egress by using the trained network based ML model. In determining the best possible service node capable of processing the received request based on the results of the one or more network checks by using the trained network based ML model, the method 600 includes identifying node configuration of each of the plurality of service nodes 704 present in the established secure real time communication session based on the determined one or more responses received for the broadcasted one or more handshake messages from the plurality of service nodes 704. Further, the method 600 includes applying the identified node configuration and the determined one or more network parameters to the trained network based ML model. The method 600 includes selecting the best possible node based on the result of application.

In an embodiment of the present disclosure, the one or more orchestrator nodes 714 are connected to the plurality of service nodes 704 via the one or more cloud mesh links. Each of the one or more orchestrator nodes 714 is an instance of a collective group of network functions hosted on the one or more resources. The method 600 includes receiving one or more mesh parameters, one or more security parameters, one or more environmental parameters and the control information from the plurality of service nodes 704 via the one or more orchestrator nodes 714. Further, the method 600 includes transmitting the collected one or more mesh parameters, the collected one or more security parameters, the collected one or more environmental parameters and the collected control information to each of the plurality of service nodes 704 via the one or more orchestrator nodes 714. In an embodiment of the present disclosure, the one or more orchestrator nodes 714 act as a higher-level logic for receiving and transmitting the one or more mesh parameters, the one or more security parameters, the one or more environmental parameters and the control information to each of the plurality of service nodes 704. Further, the one or more orchestrators 614 may include a set of orchestrator nodes to store a big picture view of the plurality of service nodes 704 or network of networks. The one or more orchestrator nodes 714 seed the plurality of cloud mesh links and notifies the plurality of mesh links about location of each of the plurality of service nodes 704, such that the plurality of service nodes 704 may communicate with each other. Thus, the plurality of cloud mesh links may be partitioned, such that the plurality of mesh links may not become too large based on the one or more environmental parameters. The plurality of service nodes 704 along with the plurality of cloud mesh links and the one or more orchestrator nodes 714 form autonomous network elements to facilitate autonomous communications between the one or more resources. In an embodiment of the present disclosure, the one or more orchestrator nodes 714 facilitate automatic addition of a set of service nodes in the network 712 for scaling the plurality of service nodes 704. Furthermore, the one or more orchestrator nodes 714 performs slice management of the plurality of service nodes 704 for the network 712. In an embodiment of the present disclosure, the plurality of service nodes 704 may slice the one or more resources in accordance with one or more sharing parameters provided by the one or more orchestrator nodes 714. The one or more orchestrator nodes 714 may also dynamically manage slicing of the one or more resources required for the network 712. In an embodiment of the present disclosure, the one or more orchestrator nodes 714 configure roaming relationships between the organization and the other organizations.

Further, the received request is processed at the determined best possible service node. In an exemplary embodiment of the present disclosure, processing the request include providing access of the one or more public network applications, running the one or more public network applications on the one or more electronic devices 108 within the enterprise network 720, securely hosting the one or more public network applications and securely streaming content of the one or more public network applications onto the one or more electronic devices 108 having restrictive access. In an embodiment of the present disclosure, it may be ensured that there are no traffic loops or ping pongs of the traffic while processing the received request at the determined best possible node. In processing the received request at the determined best possible service node, the method 600 includes determining a communication path from a source node to the best possible node. Further, the method 600 includes transmitting the request from the source node to the best possible node via the determined communication path. The method 600 includes processing the received request at the determined best possible service node.

In an embodiment of the present disclosure, the method 600 includes performing one or more network activities within the established secure real time communication session based on state of processing the request. In an exemplary embodiment of the present disclosure, the one or more network activities include checking plurality of cloud mesh links, performing validation checks of the streaming content and the like.

Further, in transmitting the request from the source node to the best possible node via the determined communication path, the method 600 includes determining if there exist one or more intermediate service nodes in the determined communication path. The method 600 includes transmitting the request from the source node to the best possible service node via the determined one or more intermediate service nodes in the communication path. In an embodiment of the present disclosure, hop by hop routing is used to transmit the request from the source node to the best possible service node via the determined one or more intermediate service nodes in the communication path.

In an embodiment of the present disclosure, a dual Subscriber Identification Module (SIM) or Mobile Virtual Network Operator (MVNO) SIM allows seamless experience to the plurality of users. When the one or more electronic devices 108 associated with the plurality of users are local to the organization, the plurality of users access the plurality of service nodes 704 via the enterprise network 720. However, when the one or more electronic devices 108 move outside the enterprise network 720 associated with the organization, data associated with the one or more electronic devices 108 may be transmitted to the plurality of service nodes 704 associated with the organization via the plurality of cloud mesh links. Thus, seamless experience is provided to the plurality of users associated with the organization by anchoring data associated with the one or more electronic devices 108 to the plurality of service nodes 704 associated with the organization. Further, when a public user moves into the enterprise network 720, the enterprise network 720 identifies the public user and re-anchors traffic associated with the public user to service nodes corresponding to the public network 706.

Furthermore, the established secure real time communication session is terminated after the received request is processed.

Further, in one embodiment of the present disclosure, the method 800 is used for more optimized way to provide seamless private to public network interconnection and public network application assignment.

Further, in one embodiment of the present disclosure, the edge manager within the set of network functions 502-1, 502-2, 502-3, 502-4 is a distributed design for realizing the orchestrator node 214 or 714.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random-access memory (RAM), a read-only memory (ROM), a rigid magnetic disk and an optical disk. Current examples of optical disks include compact disk-read only memory (CD-ROM), compact disk-read/write (CD-R/W) and DVD.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

A representative hardware environment for practicing the embodiments may include a hardware configuration of an information handling/computer system in accordance with the embodiments herein. The system herein comprises at least one processor or central processing unit (CPU). The CPUs are interconnected via processor 308 to various devices such as a random-access memory (RAM), read-only memory (ROM), and an input/output (I/O) adapter. The I/O adapter can connect to peripheral devices, such as disk units and tape drives, or other program storage devices that are readable by the system. The system can read the inventive instructions on the program storage devices and follow these instructions to execute the methodology of the embodiments herein.

The system further includes a user interface adapter that connects a keyboard, mouse, speaker, microphone, and/or other user interface devices such as a touch screen device (not shown) to the bus to gather user input. Additionally, a communication adapter connects the bus to a data processing network, and a display adapter connects the bus to a display device which may be embodied as an output device such as a monitor, printer, or transmitter, for example.

A description of an embodiment with several components in communication with each other does not imply that all such components are required. On the contrary, a variety of optional components are described to illustrate the wide variety of possible embodiments of the invention. When a single device or article is described herein, it will be apparent that more than one device/article (whether or not they cooperate) may be used in place of a single device/article. Similarly, where more than one device or article is described herein (whether or not they cooperate), it will be apparent that a single device/article may be used in place of the more than one device or article, or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open-ended in that an item or items following any one of these words is not meant to be an exhaustive listing of such item or items or meant to be limited to only the listed item or items. It must also be noted that as used herein and in the appended claims, the singular forms "a," "an," and "the" include plural references unless the context clearly dictates otherwise.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the embodiments of the present invention are intended to be illustrative, but not limiting, of the scope of the invention, which is set forth in the following claims.

The invention claimed is:

1. A computing system for autonomous data and signalling traffic management in a distributed infrastructure, the computing system comprising:
    one or more networking units;
    one or more processors; and
    a memory coupled to the one or more networking units and the one or more processors, wherein the memory comprises programmable instructions executable by the one or more networking units and the one or more processors, when executed by the one or more networking units and the one or more processors cause operations comprising:
    receiving a request from one or more electronic devices within a communication network to access one of: one or more services hosted on one or more external devices and a set of services hosted on internet, wherein the request comprises: address of the one or more external devices and wherein the one or more external devices comprise: one or more local servers, one or more cloud servers, one or more proxy servers, compute nodes, content data network, internet and a set of network functions;
    determining one or more network parameters based on the received request, one or more device parameters and one or more computing system parameters by using a trained traffic management based Machine Learning (ML) model;
    determining current network demand within a cloud infrastructure based on the received request by using the trained traffic management based ML model;
    determining one or more service nodes at multiple levels of hierarchy within the cloud infrastructure from a plurality of service nodes based on the determined one or more network parameters and the determined current network demand by using the trained traffic management based ML model, wherein the multiple levels of hierarchy comprise: a first level of hierarchy, a second level of hierarchy and a third level of hierarchy;
    dynamically establishing one or more cloud mesh links between the determined one or more service nodes at the multiple levels of hierarchy and the one or more external devices based on the determined one or more network parameters and the determined current network demand by using the trained traffic management based ML model; and
    processing the received request by providing access of the one or more services hosted on the one or more external devices to the one or more electronic devices via the established one or more cloud mesh links.

2. The computing system of claim 1, wherein the computing system corresponds to a service node, wherein the service node is an instance of a collective group of network functions hosted on one or more data centers.

3. The computing system of claim 1, wherein the one or more cloud mesh links at multiple levels of hierarchy are secured ad hoc routing connections encrypted via one or more encryption techniques, wherein the one or more encryption techniques comprise: IP Security (IPSEC) and Blockchain.

4. The computing system of claim 1, the operations further comprising:
 determining the one or more device parameters associated with the one or more electronic devices and the one or more external devices based on the received request, wherein the one or more device parameters comprise: type of network associated with the one or more electronic devices, type of the one or more electronic devices, type of the one or more external devices, type of the one or more services associated with the one or more external devices and location of the one or more electronic devices.

5. The computing system of claim 1, wherein in determining the one or more service nodes at the multiple levels of hierarchy within the cloud infrastructure from the plurality of service nodes based on the determined one or more network parameters and the determined current network demand by using the trained traffic management based ML model, wherein the determining one or more service nodes at multiple levels of hierarchy within the cloud infrastructure comprises:
 determining one or more node parameters corresponding to the plurality of service nodes based on the determined one or more network parameters, the determined current network demand and the received request by using the trained traffic management based ML model, wherein the one or more node parameters comprise: zone of each of the plurality of service nodes, availability of each of the plurality of services nodes, distance between the plurality of service nodes and the one or more electronic devices and distance between the plurality of service nodes and the one or more external devices;
 correlating the determined one or more node parameters with the determined one or more network parameters and the determined current network demand by using the trained traffic management based ML model; and
 determining the one or more service nodes at the multiple levels of hierarchy within the cloud infrastructure from the plurality of service nodes based on result of correlation.

6. The computing system of claim 1, wherein in dynamically establishing the one or more cloud mesh links between the determined one or more service nodes at the multiple levels of hierarchy and the one or more external devices based on the determined one or more network parameters and the determined current network demand by using the trained traffic management based ML model, wherein the dynamically establishing one or more cloud mesh links comprises:
 determining a communication path with the determined one or more service nodes at the multiple levels of hierarchy to reach the one or more external devices based on the determined one or more network parameters, the determined current network demand and the determined one or more node parameters by using the trained traffic management based ML model;
 sending a request to each of the determined one or more service nodes at the multiple levels of hierarchy;
 obtaining acknowledgement of the sent request from each of the determined one or more service nodes at the multiple levels of hierarchy; and
 dynamically establishing the one or more cloud mesh links between the determined one or more service nodes at the multiple levels of hierarchy based on the determined communication path, the determined one or more network parameters, the determined current network demand and the determined one or more node parameters by using the trained traffic management based ML model upon obtaining the acknowledgment from each of the determined one or more service nodes at the multiple levels of hierarchy.

7. The computing system of claim 1, wherein processing the request comprises:
 providing access of the one or more services hosted on the one or more external devices to the one or more external devices via the established one or more cloud mesh links, running the one or more services on the one or more electronic devices within the communication network, securely streaming content of the one or more services onto the one or more electronic devices with restrictive access, providing access of the one or more external devices to the one or more electronic devices and facilitating communication between the one or more electronic devices and the one or more external devices.

8. The computing system of claim 1, the operations further comprising:
 receiving one or more mesh parameters, one or more security parameters, one or more environmental parameters and the control information from the plurality of service nodes via one or more orchestrator nodes, wherein the one or more orchestrator nodes are connected to the plurality of service nodes via a set of cloud mesh links, wherein each of the one or more orchestrator nodes is an instance of a collective group of network functions hosted on one or more data centers; and
 transmitting the collected one or more mesh parameters, the collected one or more security parameters, the collected one or more environmental parameters and the collected control information to each of the plurality of service nodes via the one or more orchestrator nodes.

9. The computing system of claim 1, the operations further comprising:
 slicing the one or more service nodes at the multiple levels of hierarchy based on predefined sharing arrangements; and
 allocating the sliced one or more service nodes at the multiple levels of hierarchy to each of the one or more users for processing the received request based on the predefined sharing arrangements.

10. The computing system of claim 1, wherein the one or more network parameters comprise: routing information, control information, tree topology, cost to reach each of the plurality of service nodes, resilience requirement and a set of services peered to each of the plurality of service nodes.

11. A method for autonomous data and signalling traffic management in a distributed infrastructure, the comprising:
 receiving, by one or more networking units, a request from one or more electronic devices within a communication network to access one of: one or more services hosted on one or more external devices and a set of services hosted on internet, wherein the request comprises: address of the one or more external devices and wherein the one or more external devices comprise: one or more local servers, one or more cloud servers, one or more proxy servers, compute nodes, content data network, internet and a set of network functions;

determining, by the one or more networking units, one or more network parameters based on the received request, one or more device parameters and one or more computing system parameters by using a trained traffic management based Machine Learning (ML) model;

determining, by the one or more networking units, current network demand within a cloud infrastructure based on the received request by using the trained traffic management based ML model;

determining, by the one or more networking units, one or more service nodes at multiple levels of hierarchy within the cloud infrastructure from a plurality of service nodes based on the determined one or more network parameters and the determined current network demand by using the trained traffic management based ML model, wherein the multiple levels of hierarchy comprise: a first level of hierarchy, a second level of hierarchy and a third level of hierarchy;

dynamically establishing, by the one or more networking units, one or more cloud mesh links between the determined one or more service nodes at the multiple levels of hierarchy and the one or more external devices based on the determined one or more network parameters and the determined current network demand by using the trained traffic management based ML model; and processing, by the one or more networking units, the received request by providing access of the one or more services hosted on the one or more external devices to the one or more electronic devices via the established one or more cloud mesh links.

12. The method of claim 11, wherein the method is performed by a service node, wherein the service node is an instance of a collective group of network functions hosted on one or more data centers.

13. The method of claim 11, wherein the one or more cloud mesh links are secured ad hoc routing connections encrypted via one or more encryption techniques, wherein the one or more encryption techniques comprise: IP Security (IPSEC) and Blockchain.

14. The method of claim 11, further comprises determining the one or more device parameters associated with the one or more electronic devices and the one or more external devices based on the received request, wherein the one or more device parameters comprise: type of network associated with the one or more electronic devices, type of the one or more electronic devices, type of the one or more external devices, type of the one or more services associated with the one or more external devices and location of the one or more electronic devices.

15. The method of claim 11, wherein determining the one or more service nodes at the first level of hierarchy within the cloud infrastructure from the plurality of service nodes based on the determined one or more network parameters and the determined current network demand by using the trained traffic management based ML model comprises:

determining one or more node parameters corresponding to the plurality of service nodes based on the determined one or more network parameters, the determined current network demand and the received request by using the trained traffic management based ML model, wherein the one or more node parameters comprise: zone of each of the plurality of service nodes, availability of each of the plurality of services nodes, distance between the plurality of service nodes and the one or more electronic devices and distance between the plurality of service nodes and the one or more external devices;

correlating the determined one or more node parameters with the determined one or more network parameters and the determined current network demand by using the trained traffic management based ML model; and determining the one or more service nodes at the multiple levels of hierarchy within the cloud infrastructure from the plurality of service nodes based on result of correlation.

16. The method of claim 11, wherein dynamically establishing the one or more cloud mesh links between the determined one or more service nodes at the multiple levels of hierarchy and the one or more external devices based on the determined one or more network parameters and the determined current network demand by using the trained traffic management based ML model comprises:

determining a communication path with the determined one or more service nodes at the multiple levels of hierarchy to reach the one or more external devices based on the determined one or more network parameters, the determined current network demand and the determined one or more node parameters by using the trained traffic management based ML model;

sending a request to each of the determined one or more service nodes at the multiple levels of hierarchy;

obtaining acknowledgement of the sent request from each of the determined one or more service nodes at the multiple levels of hierarchy; and dynamically establishing the one or more cloud mesh links between the determined one or more service nodes at the multiple levels of hierarchy based on the determined optimal communication path, the determined one or more network parameters, the determined current network demand and the determined one or more node parameters by using the trained traffic management based ML model upon obtaining the acknowledgment from each of the determined one or more service nodes at the multiple levels of hierarchy.

17. The method of claim 11, wherein processing the request comprises: providing access of the one or more services hosted on the one or more external devices to the one or more external devices via the established one or more cloud mesh links, running the one or more services on the one or more electronic devices within the communication network, securely streaming content of the one or more services onto the one or more electronic devices with restrictive access, providing access of the one or more external devices to the one or more electronic devices and facilitating communication between the one or more electronic devices and the one or more external devices.

18. The method of claim 11, further comprises:

receiving one or more mesh parameters, one or more security parameters, one or more environmental parameters and the control information from the plurality of service nodes via one or more orchestrator nodes, wherein the one or more orchestrator nodes are connected to the plurality of service nodes via a set of cloud mesh links, wherein each of the one or more orchestrator nodes is an instance of a collective group of network functions hosted on one or more data centers; and transmitting the collected one or more mesh parameters, the collected one or more security parameters, the collected one or more environmental parameters and the collected control information to each of the plurality of service nodes via the one or more orchestrator nodes.

19. The method of claim 13, further comprises:

slicing the one or more service nodes at the multiple levels of hierarchy based on predefined sharing arrangements; and allocating the sliced one or more service nodes at the multiple levels of hierarchy to each of the one or more users for processing the received request based on the predefined sharing arrangements.

20. The method of claim 13, wherein the one or more network parameters comprise: routing information, control information, tree topology, cost to reach each of the plurality of service nodes, resilience requirement and a set of services peered to each of the plurality of service nodes.

* * * * *